US010841781B2

United States Patent
Abedini et al.

(10) Patent No.: US 10,841,781 B2
(45) Date of Patent: Nov. 17, 2020

(54) DISCOVERY PREAMBLE CONTENT FOR A DEVICE DISCOVERY PROCEDURE

(71) Applicant: QUALCOMM Incorporated, San Diego, CA (US)

(72) Inventors: Navid Abedini, Somerset, NJ (US); Zhibin Wu, Bedminster, NJ (US); Junyi Li, Chester, NJ (US); Sudhir Kumar Baghel, Hillsborough, NJ (US); Kapil Gulati, Dover, DE (US); Libin Jiang, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/239,408

(22) Filed: Jan. 3, 2019

(65) Prior Publication Data

US 2019/0253867 A1    Aug. 15, 2019

Related U.S. Application Data

(60) Provisional application No. 62/630,019, filed on Feb. 13, 2018.

(51) Int. Cl.
*H04W 8/00* (2009.01)
*H04W 16/28* (2009.01)
(Continued)

(52) U.S. Cl.
CPC .......... *H04W 8/005* (2013.01); *H04B 7/0617* (2013.01); *H04B 7/0695* (2013.01);
(Continued)

(58) Field of Classification Search
CPC ..... H04W 8/005; H04W 16/28; H04W 48/10; H04W 48/16; H04W 4/70; H04W 4/40;
(Continued)

(56) References Cited

U.S. PATENT DOCUMENTS

2013/0322293 A1* 12/2013 Kang .................... H04W 92/20
370/254
2014/0056220 A1 2/2014 Poitau et al.
(Continued)

FOREIGN PATENT DOCUMENTS

WO    WO-2018218198 A1    11/2018

OTHER PUBLICATIONS

International Search Report and Written Opinion—PCT/US2019/012378—ISA/EPO—dated Apr. 2, 2019.
(Continued)

*Primary Examiner* — Jae Y Lee
(74) *Attorney, Agent, or Firm* — Holland & Hart LLP

(57) ABSTRACT

Techniques are described for performing beam sweep procedures as part of a device discovery procedure. A transmitting device (e.g., user equipment (UE) or base station) may generate a discovery preamble that is configured to indicate that a discovery message will be transmitted. The discovery preamble may be a smaller message (e.g., less bits) than the discovery message and thus may use fewer resources when it is being communicated. The transmitting device may transmit a plurality of signals that include a discovery preamble as part of beam sweep procedure. Once the transmitting device identifies a receiving device, the transmitting device may broadcast the discovery message. The discovery preamble may include a variety of different types of information including information relating to an identifier for the transmitting device, a discovery mode of the transmitting device, beam configurations, communication resources, beam sweep indexes, or a combination thereof.

30 Claims, 13 Drawing Sheets

(51) Int. Cl.
| | |
|---|---|
| *H04W 48/10* | (2009.01) |
| *H04W 48/16* | (2009.01) |
| *H04B 7/06* | (2006.01) |
| *H04W 4/70* | (2018.01) |
| *H04W 4/40* | (2018.01) |
| *H04J 13/00* | (2011.01) |
| *H04W 16/14* | (2009.01) |
| *H04W 74/08* | (2009.01) |
| *H04L 27/26* | (2006.01) |
| *H04L 5/00* | (2006.01) |
| *H04B 7/08* | (2006.01) |
| *H04B 7/0413* | (2017.01) |
| *H04L 27/00* | (2006.01) |

(52) U.S. Cl.
CPC .......... *H04B 7/088* (2013.01); *H04J 13/0062* (2013.01); *H04L 5/005* (2013.01); *H04L 5/0094* (2013.01); *H04L 27/261* (2013.01); *H04L 27/2607* (2013.01); *H04W 4/40* (2018.02); *H04W 4/70* (2018.02); *H04W 16/14* (2013.01); *H04W 16/28* (2013.01); *H04W 48/10* (2013.01); *H04W 48/16* (2013.01); *H04W 74/0833* (2013.01); *H04B 7/0413* (2013.01); *H04L 5/0023* (2013.01); *H04L 5/0053* (2013.01); *H04L 5/0073* (2013.01); *H04L 5/0087* (2013.01); *H04L 2027/0095* (2013.01)

(58) Field of Classification Search
CPC .......... H04W 16/14; H04W 74/0833; H04L 27/261; H04L 5/005; H04L 27/2607; H04L 5/0094; H04L 5/0023; H04L 2027/0095; H04L 5/0053; H04L 5/0087; H04L 5/0073; H04B 7/0695; H04B 7/088; H04B 7/0617; H04B 7/0413; H04J 13/0062

See application file for complete search history.

(56) References Cited

U.S. PATENT DOCUMENTS

| | | | |
|---|---|---|---|
| 2015/0382171 | A1 | 12/2015 | Roy et al. |
| 2016/0157080 | A1* | 6/2016 | Agiwal ............... H04W 4/08 370/328 |
| 2019/0045483 | A1* | 2/2019 | Tabet ............... H04W 56/001 |
| 2019/0069215 | A1* | 2/2019 | Abouelseoud ........ H04W 16/28 |
| 2019/0090293 | A1* | 3/2019 | Su ..................... H04W 56/0015 |
| 2020/0067650 | A1* | 2/2020 | Kim ...................... H04L 5/00 |

OTHER PUBLICATIONS

Fujitsu: "On D2D Discovery Signal Design Details", 3GPP Draft; R1-141228_On D2D Discovery Signal Design Details_Final, 3rd Generation Partnership Project (3GPP), Mobile Competence Centre; 650, Route Des Lucioles; F-06921 Sophia-Anti Polls Cedex; France, vol. RAN WG1, No. Shenzhen, China; Mar. 31, 2014-Apr. 4, 2014 Mar. 30, 2014 (Mar. 30, 2014), XP050786903, Retrieved from the Internet: URL:http://www.3gpp.org/ftp/Meetings_3GPP_SYNC/RAN1/Docs/ [retrieved on Mar. 30, 2014), Sections 1, 2, 2.1, 5 pages.

Itri: "Discovery Preamble Design for AGC Consideration in SC-FDM Systems", 3GPP TSG RAN WG1 Meeting #76bis, 3GPP Draft; R1-141479, 3rd Generation Partnership Project (3GPP), Mobile Competence Centre; 650, Route Des Lucioles; F-06921 Sophia-AntiPolls Cedex; France, vol. RAN WG1, No. Shenzhen, China; Mar. 31, 2014-Apr. 4, 2014, Mar. 30, 2014, 8 Pages, XP050787148, Retrieved from the Internet: URL: http://www.3gpp.org/ftp/Meetings_3GPP_SYNC/RAN1/Docs/ [retrieved on Mar. 30, 2014], section 2.2, 8 pages.

* cited by examiner

_US 10,841,781 B2_

DISCOVERY PREAMBLE CONTENT FOR A DEVICE DISCOVERY PROCEDURE

CROSS REFERENCE

The present Application for patent claims the benefit of U.S. Provisional Patent Application No. 62/630,019 by ABEDINI, et al., entitled "DISCOVERY PREAMBLE CONTENT FOR A DEVICE DISCOVERY PROCEDURE," filed Feb. 13, 2018, assigned to the assignee hereof, and expressly incorporated by reference herein.

BACKGROUND

The following relates generally to wireless communication, and more specifically to content for a discovery preamble used during a device discovery procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as a UE. In some deployments (e.g., millimeter wave (mmW) deployments and some sub-6 GHz deployments), wireless devices may communicate using beamforming (e.g., directional transmission/reception) to shape or steer an antenna beam (e.g., a transmit beam or receive beam) along a spatial path. In some cases, however, the overhead associated with transmitting signals using beamforming may be high, which may be detrimental to a wireless communications system.

SUMMARY

The described techniques relate to improved methods, systems, devices, or apparatuses that support content for a discovery preamble used during a device discovery procedure. Generally, the described techniques provide for performing beam sweep procedures as part of a device discovery procedure that limit the amount of resources used. A transmitting device (e.g., user equipment (UE) or base station) may generate a discovery preamble that is configured to indicate that a discovery message will be transmitted. The discovery preamble may be a smaller message (e.g., less bits) than the discovery message and thus may use fewer resources when it is being communicated. The transmitting device may transmit a plurality of signals that may include a discovery preamble as part of beam sweep procedure. Once the transmitting device identifies a receiving device, the transmitting device may broadcast the discovery message. The discovery preamble may include a variety of different types of information including information relating to an identifier for the transmitting device, a discovery mode of the transmitting device, beam configurations, communication resources, beam sweep indexes, or a combination thereof.

A method of wireless communication is described. The method may include generating a discovery preamble and a discovery message in a device discovery procedure, where the discovery preamble includes information indicating that the discovery message will be transmitted, transmitting a plurality of signals that include the discovery preamble as part of a beam sweeping procedure performed during the device discovery procedure, and transmitting the discovery message based at least in part on transmitting the discovery preamble.

An apparatus for wireless communication is described. The apparatus may include means for generating a discovery preamble and a discovery message in a device discovery procedure, where the discovery preamble includes information indicating that the discovery message will be transmitted, means for transmitting a plurality of signals that include the discovery preamble as part of a beam sweeping procedure performed during the device discovery procedure, and means for transmitting the discovery message based at least in part on transmitting the discovery preamble.

Another apparatus for wireless communication is described. The apparatus may include a processor, memory in electronic communication with the processor, and instructions stored in the memory. The instructions may be operable to cause the processor to generate a discovery preamble and a discovery message in a device discovery procedure, where the discovery preamble includes information indicating that the discovery message will be transmitted, transmit a plurality of signals that include the discovery preamble as part of a beam sweeping procedure performed during the device discovery procedure, and transmit the discovery message based at least in part on transmitting the discovery preamble.

A non-transitory computer-readable medium for wireless communication is described. The non-transitory computer-readable medium may include instructions operable to cause a processor to generate a discovery preamble and a discovery message in a device discovery procedure, where the discovery preamble includes information indicating that the discovery message will be transmitted, transmit a plurality of signals that include the discovery preamble as part of a beam sweeping procedure performed during the device discovery procedure, and transmit the discovery message based at least in part on transmitting the discovery preamble.

Some examples of the method, apparatus, and non-transitory computer-readable medium described above may further include processes, features, means, or instructions for generating a preamble identifier based at least in part on an identifier of a device that transmits the discovery message, where the discovery preamble includes the preamble identifier.

Some examples of the method, apparatus, and non-transitory computer-readable medium described above may further include processes, features, means, or instructions for identifying a discovery mode of a transmitting device. Some examples of the method, apparatus, and non-transitory computer-readable medium described above may further include processes, features, means, or instructions for generating a discovery mode identifier based at least in part on identifying the discovery mode, where the discovery preamble includes the discovery mode identifier.

Some examples of the method, apparatus, and non-transitory computer-readable medium described above may further include processes, features, means, or instructions for identifying the discovery mode based at least in part on one or more of whether the transmitting device may be requesting information, the transmitting device may be offering to share information, or a type of information requested or offered.

Some examples of the method, apparatus, and non-transitory computer-readable medium described above may further include processes, features, means, or instructions for identifying a beam configuration for transmitting at least one of the discovery message or the discovery preamble. Some examples of the method, apparatus, and non-transitory computer-readable medium described above may further include processes, features, means, or instructions for generating a beam configuration identifier based at least in part on identifying the beam configuration, where the discovery preamble includes the beam configuration identifier.

Some examples of the method, apparatus, and non-transitory computer-readable medium described above may further include processes, features, means, or instructions for identifying a communication resource or a configuration for transmitting the discovery message. Some examples of the method, apparatus, and non-transitory computer-readable medium described above may further include processes, features, means, or instructions for generating a communication resource identifier or a configuration identifier based at least in part on identifying the communication resource, where the discovery preamble includes the communication resource identifier or the configuration identifier.

Some examples of the method, apparatus, and non-transitory computer-readable medium described above may further include processes, features, means, or instructions for identifying a beam sweep index of a plurality of beams that carries the discovery preamble. Some examples of the method, apparatus, and non-transitory computer-readable medium described above may further include processes, features, means, or instructions for generating a beam sweep index identifier based at least in part on identifying the beam sweep index, where the discovery preamble includes the beam sweep index.

In some examples of the method, apparatus, and non-transitory computer-readable medium described above, the beam sweep index identifier includes one or more of a beam sweeping periodicity, a number of discovery signals transmitted within a period, a resource pattern within the period, a quasi-collocation assumption between different signals, or whether some signals may be repeated.

In some examples of the method, apparatus, and non-transitory computer-readable medium described above, the discovery preamble includes one or more of a preamble identifier, a discovery mode identifier, a beam configuration identifier, a communication resource identifier, a configuration identifier, or a beam sweep index identifier.

In some examples of the method, apparatus, and non-transitory computer-readable medium described above, the discovery preamble includes one or more of a zadoff-chu sequence, a pseudo-noise sequence, or an m-sequence.

In some examples of the method, apparatus, and non-transitory computer-readable medium described above, the discovery preamble includes a sequence generated using one or more of an amount of cyclic shift, a scrambling sequence, or communication resources used to transmit the discovery preamble.

In some examples of the method, apparatus, and non-transitory computer-readable medium described above, the discovery preamble may be a static message used by a plurality of transmitting devices.

Some examples of the method, apparatus, and non-transitory computer-readable medium described above may further include processes, features, means, or instructions for establishing a device-to-device (D2D) communication link in a vehicle-to-everything (V2X) communication network based at least in part on transmitting the discovery message.

Some examples of the method, apparatus, and non-transitory computer-readable medium described above may further include processes, features, means, or instructions for receiving a message in response to transmitting the discovery preamble, where transmitting the discovery message may be based at least in part on receiving the message.

In some examples of the method, apparatus, and non-transitory computer-readable medium described above, the discovery message includes one or more of information related to a random access channel (RACH) procedure to establish a communication link between two devices, an identifier of a transmitting device, or sensor information.

A method of wireless communication is described. The method may include receiving a discovery preamble as part of a device discovery procedure, where the discovery preamble includes information indicating that a discovery message will be transmitted, determining whether to monitor for the discovery message of the device discovery procedure based at least in part on receiving the discovery preamble, and monitoring for the discovery message based at least in part on the determination.

An apparatus for wireless communication is described. The apparatus may include means for receiving a discovery preamble as part of a device discovery procedure, where the discovery preamble includes information indicating that a discovery message will be transmitted, means for determining whether to monitor for the discovery message of the device discovery procedure based at least in part on receiving the discovery preamble, and means for monitoring for the discovery message based at least in part on the determination.

Another apparatus for wireless communication is described. The apparatus may include a processor, memory in electronic communication with the processor, and instructions stored in the memory. The instructions may be operable to cause the processor to receive a discovery preamble as part of a device discovery procedure, where the discovery preamble includes information indicating that a discovery message will be transmitted, determine whether to monitor for the discovery message of the device discovery procedure based at least in part on receiving the discovery preamble, and monitor for the discovery message based at least in part on the determination.

A non-transitory computer-readable medium for wireless communication is described. The non-transitory computer-readable medium may include instructions operable to cause a processor to receive a discovery preamble as part of a device discovery procedure, where the discovery preamble includes information indicating that a discovery message will be transmitted, determine whether to monitor for the discovery message of the device discovery procedure based at least in part on receiving the discovery preamble, and monitor for the discovery message based at least in part on the determination.

Some examples of the method, apparatus, and non-transitory computer-readable medium described above may further include processes, features, means, or instructions for identifying one or more characteristics of the discovery message based at least in part on receiving the discovery preamble, where determining whether to monitor for the discovery message may be based at least in part on identifying the one or more characteristics of the discovery message.

Some examples of the method, apparatus, and non-transitory computer-readable medium described above may further include processes, features, means, or instructions for identifying a preamble identifier based at least in part on receiving the discovery preamble, where determining whether to monitor for the discovery message may be based at least in part on identifying the preamble identifier.

Some examples of the method, apparatus, and non-transitory computer-readable medium described above may further include processes, features, means, or instructions for identifying a discovery mode of a transmitting device based at least in part on receiving the discovery preamble, where determining whether to monitor for the discovery message may be based at least in part on identifying the discovery mode.

In some examples of the method, apparatus, and non-transitory computer-readable medium described above, the discovery mode may be based at least in part on one or more of whether the transmitting device may be requesting information, the transmitting device may be offering to share information, or a type of information requested or offered.

Some examples of the method, apparatus, and non-transitory computer-readable medium described above may further include processes, features, means, or instructions for identifying a beam configuration of the discovery message based at least in part on receiving the discovery preamble, where monitoring for the discovery message may be based at least in part on identifying the beam configuration.

Some examples of the method, apparatus, and non-transitory computer-readable medium described above may further include processes, features, means, or instructions for identifying a communication resource or a configuration for communicating the discovery message based at least in part on receiving the discovery preamble, where monitoring for the discovery message may be based at least in part on identifying the communication resource or the configuration.

Some examples of the method, apparatus, and non-transitory computer-readable medium described above may further include processes, features, means, or instructions for identifying a beam sweep index of a plurality of beams that carries the discovery preamble based at least in part on receiving the discovery preamble, where monitoring for the discovery message may be based at least in part on identifying the beam sweep index of the discovery preamble.

In some examples of the method, apparatus, and non-transitory computer-readable medium described above, the beam sweep index includes one or more of a beam sweeping periodicity, a number of discovery signals transmitted within a period, a resource pattern within the period, a quasi-collocation assumption between different signals, or whether some signals may be repeated.

In some examples of the method, apparatus, and non-transitory computer-readable medium described above, the discovery preamble includes one or more of a preamble identifier, a discovery mode identifier, a beam configuration identifier, a communication resource identifier, a configuration identifier, or a beam sweep index identifier.

In some examples of the method, apparatus, and non-transitory computer-readable medium described above, the discovery preamble may be a static message used by a plurality of transmitting device.

Some examples of the method, apparatus, and non-transitory computer-readable medium described above may further include processes, features, means, or instructions for receiving the discovery message based at least in part on monitoring for the discovery message. Some examples of the method, apparatus, and non-transitory computer-readable medium described above may further include processes, features, means, or instructions for establishing a device-to-device (D2D) communication link in a vehicle-to-everything (V2X) communication network based at least in part on receiving the discovery message.

Some examples of the method, apparatus, and non-transitory computer-readable medium described above may further include processes, features, means, or instructions for transmitting a message in response to receiving the discovery preamble, where the discovery message may be received based at least in part on transmitting the message.

In some examples of the method, apparatus, and non-transitory computer-readable medium described above, the discovery message includes one or more of information related to a random access channel (RACH) procedure to establish a communication link between two devices, an identifier of a transmitting device, or sensor information.

DETAILED DESCRIPTION

Figure 1:
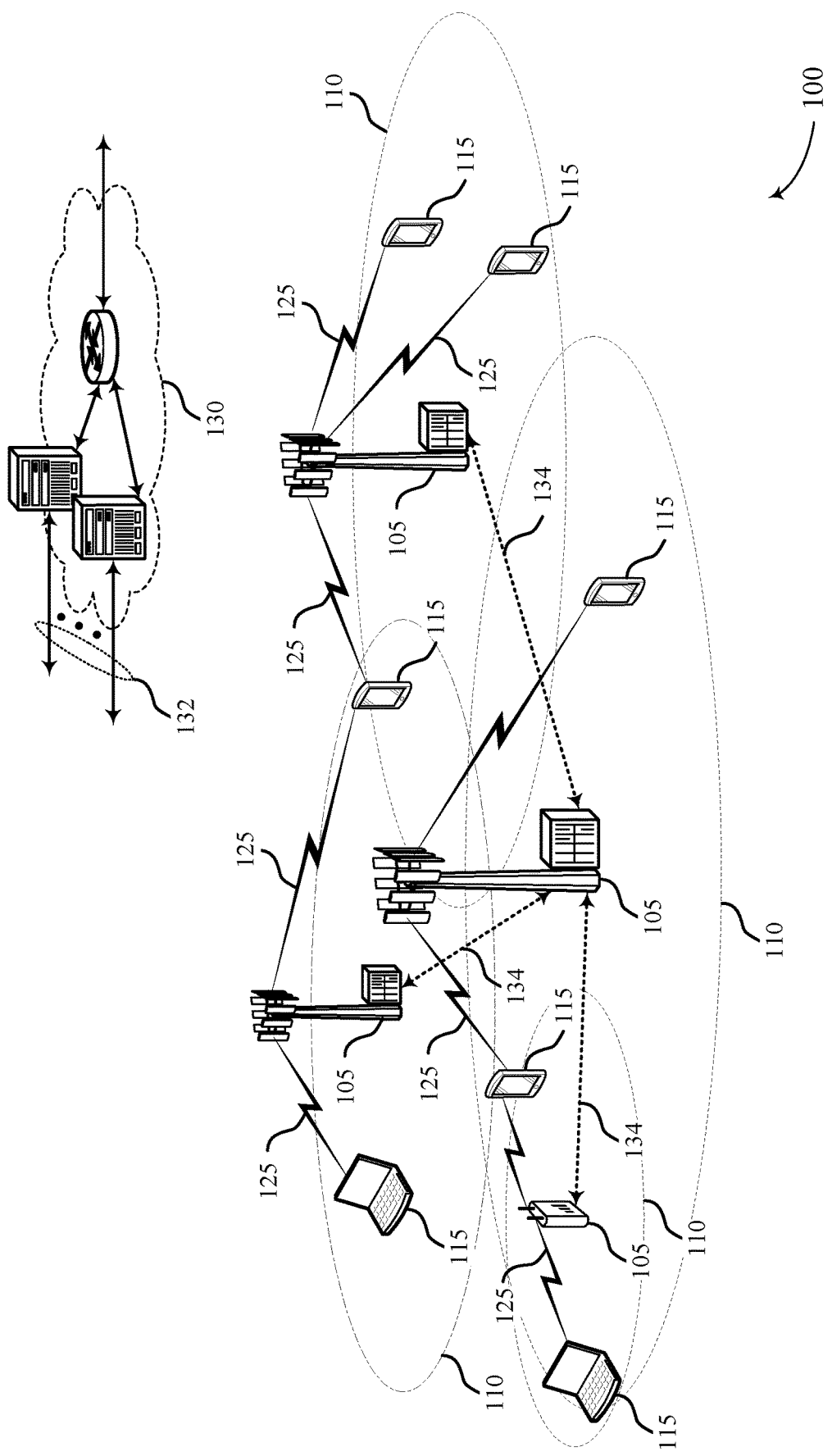
FIG. 1 illustrates an example of a system for wireless communication that supports content for a discovery preamble used during a device discovery procedure in accordance with aspects of the present disclosure.

Some wireless communications systems may support beamforming to improve the reliability of transmissions from a transmitting device to a receiving device (e.g., in millimeter wave (mmW) deployments). In such systems, a transmitting device may use multiple antennas or antenna arrays to conduct beamforming operations for directional communications with a receiving device. In some aspects of a mmW deployments, it may be appropriate for a transmitting device to discovery a second device before establishing a beam pair link (BPL) with the second device. To discover another device in a wireless communications system that uses directional beams, a transmitting device such as a user equipment (UE) may broadcast a discovery message in a plurality of directions in a beam sweep to identify other UEs in the wireless communications system. In some cases, the other devices in the wireless communication may listen in a plurality of directions to identify other UEs in the wireless communication system. Such a procedure of coordinated transmissions and/or coordinated listening may be an example of a device discovery procedure for a vehicle-to-everything (V2X) communications system. After two or more devices discovery each other, one or more communication links between the devices may be established.

In order for a transmitting device to cover an appropriate angular region of coverage area during a device discovery procedure, the transmitting device may broadcast the data multiple times in different directions. Accordingly, a large amount of resources may be allocated to the transmitting device for the broadcast transmissions, resulting in high overhead in a wireless communications system. Further, the amount of power consumed at a transmitting device for transmitting the broadcast transmission using beamforming and the amount of power consumed at a receiving device for processing the received broadcast transmission (e.g., blind decoding a channel in the large amount of resources allocated for the broadcast transmission) may be high. In addition to these inefficiencies, because the broadcast transmission may not be received by an intended receiver (e.g., when no receiver is present in the beam-swept directions), the resources and power used for the broadcast transmission may be wasted.

Techniques are described herein for efficiently performing beam sweep procedures as part of a device discovery procedure that limit the amount of communication resources or computational resources used in such procedures. A transmitting device (e.g., a UE or a base station) may generate a discovery preamble that is configured to indicate that a discovery message will be transmitted by the transmitting device. The discovery preamble may be a smaller message (e.g., less bits) than the discovery message and thus may use fewer resources when it is being communicated. The transmitting device may transmit a plurality of signals that include a discovery preamble as part of beam sweep procedure. Once the transmitting device identifies a receiving device or identifies the beam for communicating with a receiving device, the transmitting device may broadcast the discovery message. The discovery preamble may include a variety of different types of information including information relating to an identifier for the transmitting device, a discovery mode of the transmitting device, beam configurations, communication resources, beam sweep indexes, or a combination thereof.

Aspects of the disclosure are initially described in the context of a wireless communications system. Examples of processes and signaling exchanges that support discovery procedure signaling are then described. Aspects of the disclosure are further illustrated by and described with reference to apparatus diagrams, system diagrams, and flowcharts that relate to content for a discovery preamble used during a device discovery procedure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications system, devices may have to discovery each before they can establish a communication. For example, in wireless communications systems that utilize directional beams and beam pair links, a device discovery procedure may be used to align transmission directions with reception directions and thereby begin the process of establishing a beam pair link. Such device discovery procedures and the associated beam sweeping may require a large amount of communication resources and/or computation resources to complete. Techniques are described herein for performing beam sweep procedures as part of a device discovery procedure that limit the amount of resources used. Such techniques may employ the use of a discovery preamble that may be a smaller message (e.g., less bits) than a discovery message and thus may use fewer resources when it is being communicated. The transmitting device may perform beam sweeping using the discovery preamble. Once the transmitting device identifies a receiving device, the transmitting device may broadcast the discovery message. The discovery preamble may include a variety of different types of information including information relating to an identifier for the transmitting device, a discovery mode of the transmitting device, beam configurations, communication resources, beam sweep indexes, or a combination thereof.

Figure 2:
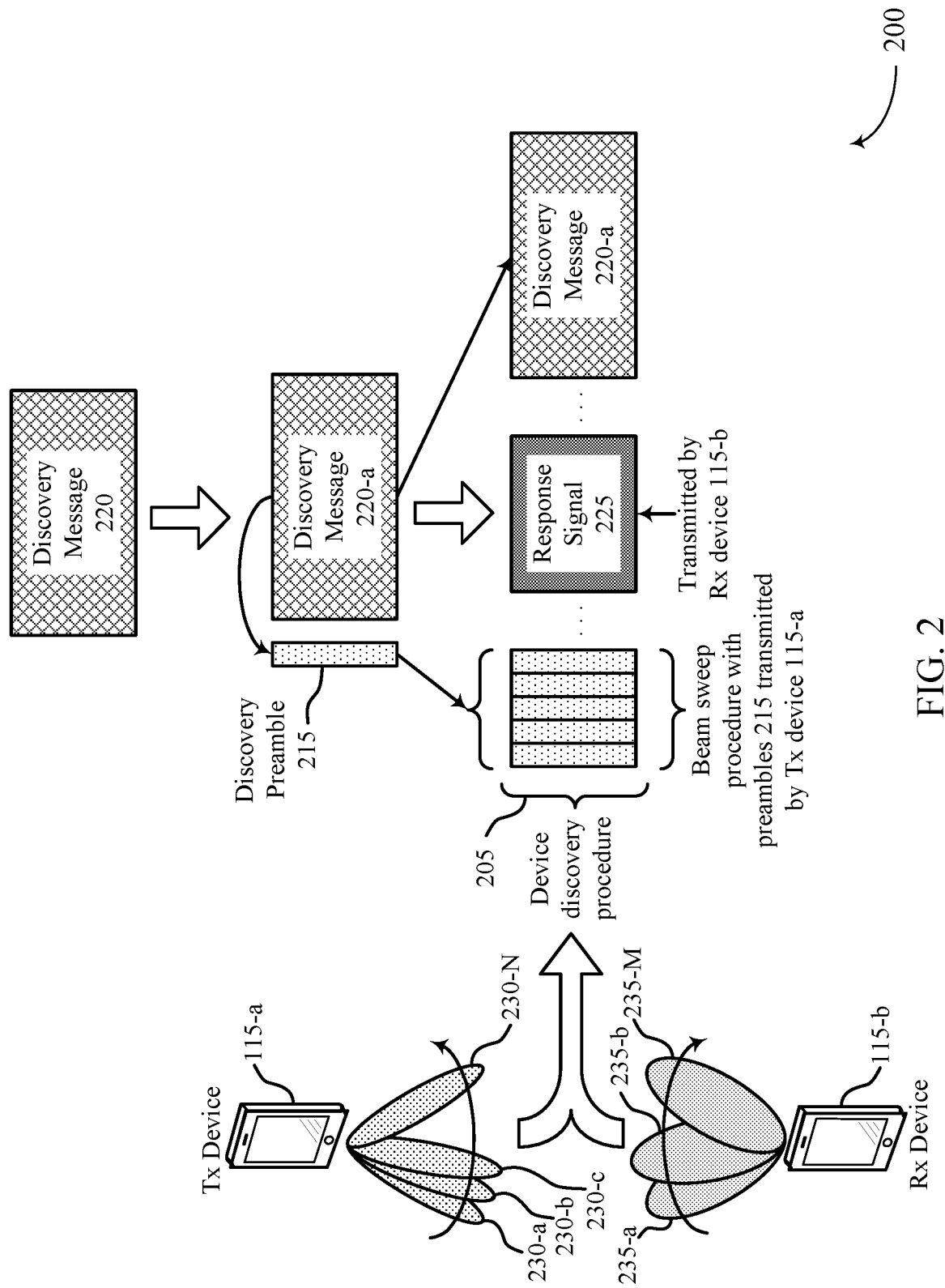
FIG. 2 illustrates an example of a wireless communications system that supports content for a discovery preamble used during a device discovery procedure in accordance with aspects of the present disclosure.

FIG. 2 illustrates an example of a wireless communications system 200 that supports content for a discovery preamble used during a device discovery procedure in accordance with various aspects of the present disclosure. The wireless communications system 200 may include a transmitting UE 115-a and a receiving UE 115-b, which may be examples of a UE 115 described with reference to FIG. 1. The wireless communications system 200 illustrates a device discovery procedure 205 performed by transmitting UE 115-a and the receiving UE 115-b. Some wireless communications system may use directional beams to communicate information. For the UE 115-a to communicate information with the UE 115-b both UEs have to be transmitting and listening in the correct directions. If there is a mismatch between the directional transmission and the directional listening, the UEs 115-a, 115-b may not be able to communicate. Before establishing an active beam pair link in a directional communication system, the UEs 115-a, 115-b may first discover the position of the other device using a device discovery procedure. Once the other device is discovered, a random access channel (RACH) procedure may be initiated to establish the beam pair link between the UEs 115-a, 115-b. Once the beam pair link is established, other procedures may be used to refine and maintain the beam pair link between the UEs 115-a, 115-b. It is to be understood that the techniques described herein may be applicable to communications between UEs/mobile devices in device-to-device (D2D) wireless communication systems such as vehicle-to-everything (V2X) wireless communication systems and between a base station and a UE (e.g., for discovery signaling in an initial access procedure).

Wireless communications system 200 may implement aspects of wireless communications system 100. For example, UEs 115 in wireless communications system 200 may support techniques for limiting the amount of resources and power used for beam sweeping during a device discovery procedure 205. During many device discovery procedures, the transmitting UE 115-*a* may transmit a discovery message 220 that includes information needed to establish a beam pair link with another device. The transmitting UE 115-*a* may transmit such discovery messages 220 multiple times and/or in multiple directions using a transmission beam sweep pattern without knowing if any device is listening. Other devices may listen for such discovery messages 220 in multiple directions using a reception beam sweep pattern. If the receiving UE 115-*b* receives and successfully decodes a discovery message 220, the receiving UE 115-*b* may transmit some kind of response message that begins RACH procedure between the UEs 115-*a*, 115-*b*.

Such device discovery procedures that blindly transmit discovery messages 220 as part of a beam sweep procedure may use a large number of communication resources. For example, a beam sweep procedure may include the transmitting UE 115-*a* transmitting messages using N number of transmission beams 230 and the receiving UE 115-*b* using M number of listening configurations 235. To discover another device, a beam sweep procedure may have to cycle through every possible pairing of transmission beam 230-N and listening configuration 235-M. To improve the efficient use of communication resources in the wireless communications system 200 that uses directional beams, a device discovery procedure 205 may include a discovery preamble 215 that is transmitted (e.g., by UE 115-*a*) during a beam sweep procedure to first identify a receiving device or identify a suitable beam for communicating with a receiving device (e.g., UE 115-*b*). For example, a plurality of directional signals may be transmitted in a plurality of different directions, where each signal may include the discovery preamble. The receiving UE 115-*b* may receive the discovery preamble 215 and may identify a suitable beam for communicating with transmitting UE 115-*a*. In some cases, receiving UE 115-*b* may then transmit a response signal 225 in response to the discovery preamble 215 (e.g., a query signal requesting or triggering the transmission of the discovery message 220-*a*).

Once the UE 115-*a* identifies the receiving UE 115-*b* (e.g., based on receiving the response signal 225), UE 115-*a* may transmit the discovery message 220 to be received by the receiving UE 115-*b* using communication resources and/or transmission beams indicated by the response signal 225. Using discovery preamble 215 during the beam sweep procedure may reduce the number of communication resources and/or the number of computational resources used by a device discovery procedure, thereby freeing up additional resources for more substantive communications between the UEs 115-*a*, 115-*b*. As is described in more detail herein, the device discovery procedure 205 may be embodied differently than the example shown in FIG. 2. For example, in some cases, the transmitting UE 115-*a* may transmit sufficient signals that include discovery preamble 215 in a plurality of directions as part of a beam sweep and may transmit the discovery message 220-*a* immediately after transmitting the preamble. In such examples, the transmitting UE 115-*a* may listen for and receive the response signal 225 after blindly transmitting the discovery message 220.

As a result, using the device discovery procedure 205 described herein, the overhead associated with blindly searching for another device using directional transmissions and directional listening may be reduced. At the same time, because the discovery preamble 215 may be broadcast in a beam-sweep as part of a beam sweeping procedure, UE 115-*a* may still transmit signals across an appropriate region of the coverage area to enable a wide range of listening UEs in wireless communications system 200 to identify the transmitted beams and later receive discovery message 220-*a*. Further, because UE 115-*a* and UE 115-*b* may perform a beam sweeping procedure using a simpler signal (i.e., the discovery preamble 215 instead of the discovery message 220), the UE 115-*a* may use less power to transmit discovery preamble 215 in a beam sweep than is used to transmit discovery message 220 in a beam sweep. Similarly, the UE 115-*b* may use less power to process the discovery preamble 215 than is used to process the discovery message 220. Thereby resulting in more efficient operations at UE 115-*a* and UE 115-*b*.

The device discovery procedure 205 may be modified based on the information contained in the discovery preamble 215, the discovery message 220, and the response signal 225. The discovery preamble 215 may be generated based on the discovery message 220. In some cases, the discovery message 220 may be modified to form a second discovery message 220-*a* based on generating the discovery preamble 215. For example, some information that may have been included in a discovery message 220 may be included in a discovery preamble 215 and therefore may be missing in a discovery message 220-*a*. In other cases, however, the discovery message 220-*a* after generating the discovery preamble 215 is the same as the discovery message 220 before generating the discovery preamble 215.

The discovery message 220 may include information related to a RACH procedure that may be used to establish a communication link between the UE 115-*a* and the UE 115-*b*. The discovery message 220 may include an identifier of the transmitting UE 115-*a*. The discovery message 220 may include sensor information measured by the transmitting UE 115-*a*. The discovery message 220 may include information related to a type of discovery mode the transmitting UE 115-*a* is in. For example, the discovery message 220 may include information indicating whether the transmitting UE 115-*a* is requesting information, whether the transmitting UE 115-*a* is offering to share information, and/or the type of information that is being requested or offered.

The discovery preamble 215 may be a message that includes less information than the discovery message 220. Consequently, it may take fewer communication resources and fewer computational resources (e.g., power) to communicate a discovery preamble 215 than a discovery message 220. The discovery preamble 215 may be configured to be used as part of a beam sweep, while a discovery message 220 may be configured to be transmitted once per beam sweep of the discovery preamble.

The discovery preamble 215 may include information indicating that the discovery message 220 will be transmitted by the transmitting UE 115-*a*. The discovery preamble 215 may be configured to replace discovery message 220 in a beam sweep procedure so that the beam sweep procedure takes fewer communication resources and/or computation resources.

The discovery preamble 215 may include various combinations of information based on the type of the device discovery procedure 205. In some cases, the discovery preamble 215 may not carry any information. In such cases, the discovery preamble 215 may be a static or predetermined sequence of data that indicates a discovery message 220 will be coming in the future. Using such a sequence may simplify processing performed by the receiving UE 115-*b* because the receiving UE 115-*b* may not need to blindly check multiple preamble hypotheses. In such cases, a single preamble common to all devices that perform the device discovery procedure 205 may be used by the transmitting UE 115-*a*. In such cases, the discovery preamble 215 may be not be generated using any parts or portions of the discovery message 220.

In some cases, the discovery preamble 215 may include some information related to the device discovery procedure. For example, the discovery preamble 215 may include a preamble identifier. The preamble identifier may be configured to identify the transmitting UE 115-*a* so as to avoid re-detecting or re-processing a device that is already discovered by the receiving UE 115-*b*. In some cases, the preamble identifier is generated using the identifier of the transmitting UE 115-*a*. In such cases, the preamble identifier may be a smaller (e.g., less bits) than the identifier of the transmitting UE 115-*a*. In some cases, the preamble identifier may be the device identifier for the transmitting UE 115-*a*. In some cases, the preamble identifier may be selected from a small plurality of possible preamble identifiers (e.g., four or eight). In such cases, different devices may be mapped to these few preamble identifiers using a many-to-one mapping. Such a mapping may be done randomly, through a predefined rule, indicated by another entity (e.g., base station or access point), based on some measurements and information gathered from neighboring devices, or a combination thereof. In some cases, the preamble identifier may change over time. The transmitting UE 115-*a* may generate a preamble identifier that is included in the discovery preamble 215 based at least in part on an identifier of a device that transmits the discovery message. The receiving UE 115-*b* may identify the preamble identifier based at least in part on receiving the discovery preamble 215. After receiving the discovery preamble 215 and/or identifying the preamble identifier, the receiving UE 115-*b* may determine whether to monitor for the discovery message 220.

In some cases, the discovery preamble 215 may include information related to a discovery mode of the transmitting UE 115-*a*. The transmitting UE 115-*a* may be performing the device discovery mode for a variety of reasons. For example, the transmitting UE 115-*a* may be requesting information its needs from one or more of its neighbor devices. In another example, the transmitting UE 115-*a* may be offering to share information with one or more of its neighbor devices. Some discovery modes of the transmitting UE 115-*a* may be based on the type of information being requested or offered. For example, the transmitting UE 115-*a* may be requesting/offering sensor information to its neighboring devices. In another example, the transmitting UE 115-*a* may be requesting/offering information related to establishing a communication link with a base station or another device. In some instances, a single bit of information may be used to indicate whether the transmitting UE 115-*a* is soliciting device (e.g., requesting information) or a non-soliciting device (e.g., offering information). The transmitting UE 115-*a* may identify a discovery mode of the transmitting UE 115-*a* and generate a discovery mode identifier based at least in part on identifying the discovery mode. The receiving UE 115-*b* may identify a discovery mode of the transmitting UE 115-*a* based at least in part on receiving the discovery preamble 215. After receiving the discovery preamble 215 and/or identifying the discover mode identifier, the receiving UE 115-*b* may determine whether to monitor for the discovery message 220. For example, the receiving UE 115-*b* may decide to establish a communication link with the transmitting UE 115-*a* because it either wants at least a portion of the information being offered or has at least a portion of the information being requested.

In some cases, the discovery preamble 215 may include both the preamble identifier and the discovery mode identifier. In some instances, the transmitting UE 115-*a* may generate a single identifier that includes both the preamble identifier and the discovery mode identifier. Conversely, the receiving UE 115-*b* may identifier that single identifier upon receiving a discovery preamble 215.

In some cases, the discovery preamble 215 may include information related to communication resources or beam configurations used for transmitting at least one of the discovery message 220 or the discovery preamble 215. Because the discovery preamble 215 may be configured to indicate that the discovery message 220 will be transmitted, the discovery preamble 215 may also include information about the discovery message 220. For example, the discovery preamble 215 may include information about the beam configuration of the discovery message 220. The beam configuration may be an index value that the receiving UE 115-*b* may use to look up other information about the discovery message 220. In other instances, the beam configuration identifier may indicate information about the transmission beam (e.g., beam direction/target or beam width). In some examples, the discovery preamble 215 may include information about the communication resources and/or configuration that may be used to transmit the discovery message 220. For example, the information about the communication resources may indicate time resources and/or frequency resources that may be used to transmit the discovery message 220. For example, the information about the transmission configuration may indicate modulation coding scheme (MCS) and/or numerology that may be used to transmit the discovery message 220. The discovery preamble 215 may also include similar information about the discovery preamble 215 itself. The transmitting UE 115-*a* may identify a beam configuration, a communication resource, or a configuration for transmitting at least one of the discovery message or the discovery preamble. The transmitting UE 115-*a* may generate a beam configuration identifier, a communication resource identifier, or a configuration identifier that is included in the discovery preamble 215 based on the identifications. The receiving UE 115-*b* may identify the beam configuration, the communication resource, or the configuration of at least one of the discovery message 220 or a discovery preamble 215 based on receiving the discovery preamble 215 that includes the relevant identifiers. After receiving the discovery preamble 215 and/or identifying the relevant identifiers, the receiving UE 115-*b* may determine to monitor for the discovery message 220.

In some cases, the discovery preamble 215 may include information related to beamforming or a beam sweeping configuration of the discovery preamble 215 transmitted by the transmitting UE 115-*a*. For example, the discovery preamble 215 may include an index to identify the resource of the discovery message 220, the discovery preamble 215, or the response signal 225 within a preconfigured set of resources used for a device discovery procedure. In some cases, the discovery preamble 215 may include a beam sweep index indicating a preconfigured resource in a beam sweep being used to transmit discovery preamble 215. In some examples, the beam sweep index (or its associated identifier) may include other data about the beam sweep such as a beam sweeping periodicity, a number of discovery signals transmitted within a period for beam sweeping, a resource pattern within the period, a quasi-collocation assumption between different signals, whether some signals are repeated during the beam sweep, whether the transmitter or receiver is to sweep during a beam sweep period, or a combination thereof. The transmitting UE 115-*a* may identify a beam sweep index of a plurality of beams that carries the discovery preamble and may generate a beam sweep index identifier based on identifying the beam sweep index. The receiving UE 115-*b* may identify a beam sweep index of a plurality of beams that carries the discovery preamble based at least in part on receiving the discovery preamble 215. After receiving the discovery preamble 215 and/or identifying the beam sweep index identifier, the receiving UE 115-*b* may determine whether to monitor for the discovery message 220.

In some cases, the discovery preamble 215 may include any combination of the information and/or identifiers described herein. In some cases, a single device may be configured to initiate device discovery procedures that include different discovery preambles. In some cases, discovery preambles may vary within the same device discovery procedure. For example, a beam sweep index may change between discovery preamble transmissions based on which beam is used to carry the transmission. In some cases, different device discovery procedures may use different types of discovery preambles that include different information than other discovery preambles.

In some cases, the discovery preamble 215 may include (or may comprise) one or more sequences. Examples of the sequences of the discovery preamble 215 may include a zadoff-chu sequence, a pseudo-noise sequence, or an m-sequence. In some cases, the discovery preamble 215 may include information and/or identified generated using one or more of an amount of cyclic shift, a scrambling sequence, or communication resources used to transmit the discovery preamble.

Upon receiving the discovery preamble 215, the receiving UE 115-*b* may determine which discovery preamble 215 had the best signal quality/strength. The receiving UE 115-*b* may also identify one or more characteristics of the discovery message 220 based on the received discovery preamble 215. For example, the receiving UE 115-*b* may identify beam configurations, communication resources, the types of information included, or other characteristics of the discovery message 220. The receiving UE 115-*b* may determine whether it wants to establish a communication link with the transmitting 115-*a*. If so, the receiving 115-*b* may transmit the response signal 225 and may monitor for the discovery message 220.

The response signal 225 may include different types of information based on the configuration of the discovery preamble 215. The UE 115-*a* may transmit the discovery message 220 based on receiving such a response signal 225. Whereas, in other cases, the UE 115-*a* may refrain from transmitting the discovery message 220 if no response signal 225 is received. In some cases, the response signal 225 may be an example of query message that requests additional information from transmitting UE 115-*a*. In some cases, the response signal 225 may be an example of an acknowledgement message that indicates that the receiving UE 115-*b* received at least one of the signals that include discovery preamble 215. The response signal 225 may carry no information, in some cases. In other cases, the response signal 225 may carry some information such as the identifier of the receiving UE 115-*b*, a beam index of the received discovery preamble 215, other information about the received discovery preamble 215, information related to a RACH procedure, or a combination thereof.

After the transmitting UE 115-*a* receives the response signal 225 and/or after the receiving UE 115-*b* receives the discovery message 220, the UEs 115-*a*, 115-*b* may establish a communication link or a beam pair link. The UEs may initiate a RACH procedure to establish the beam pair link. The communication link may comprise a transmission beam and a reception beam. In some cases, the communication link may be between two devices in a D2D network or in a V2X network. In some cases, the communication link may be between a UE and a base station, or between two base stations.

Figure 3:
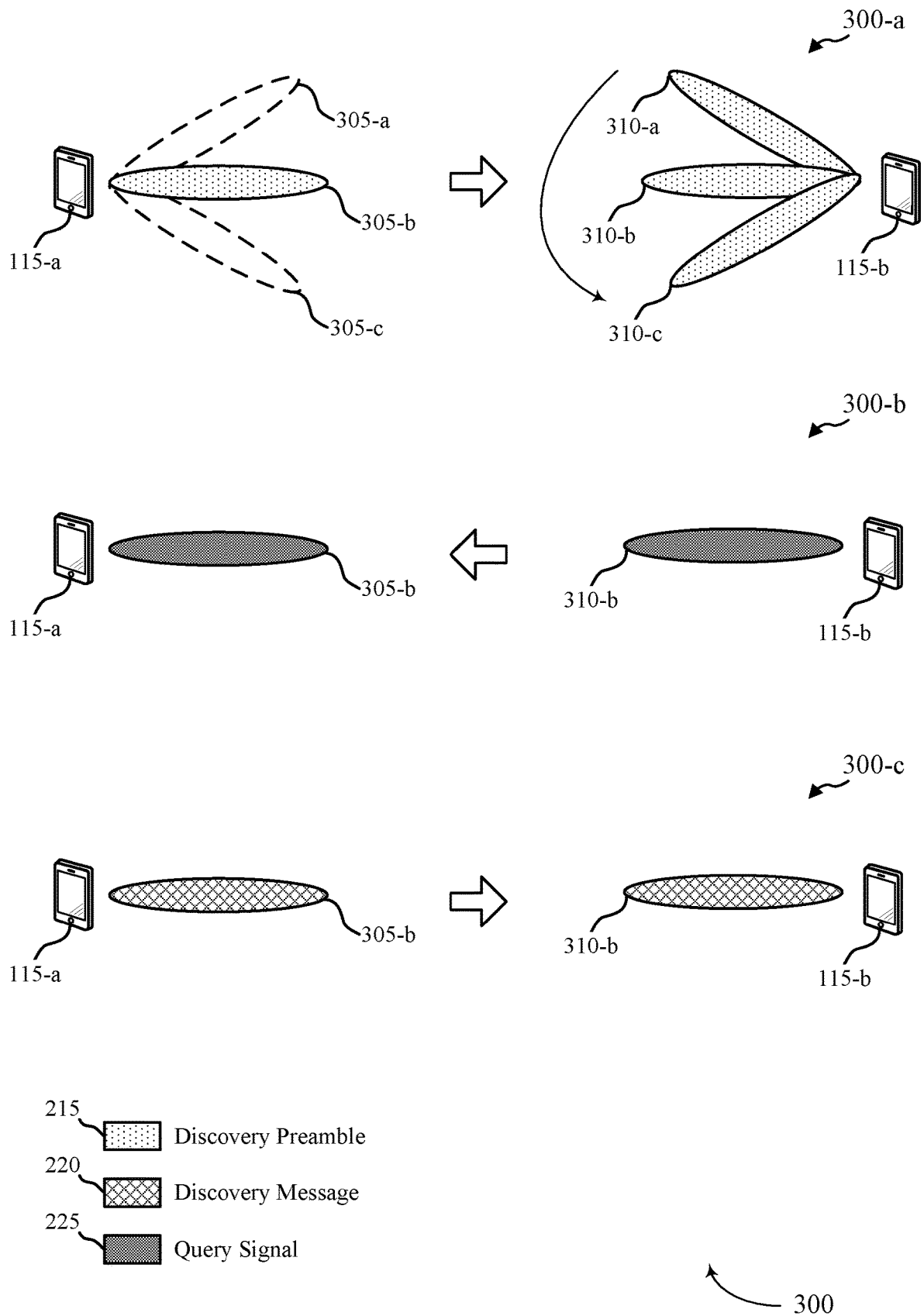
FIGS. 3-5 illustrate examples of beam sweeping procedures for discovery signaling that support content for a discovery preamble used during a device discovery procedure in accordance with aspects of the present disclosure.
Figure 4:
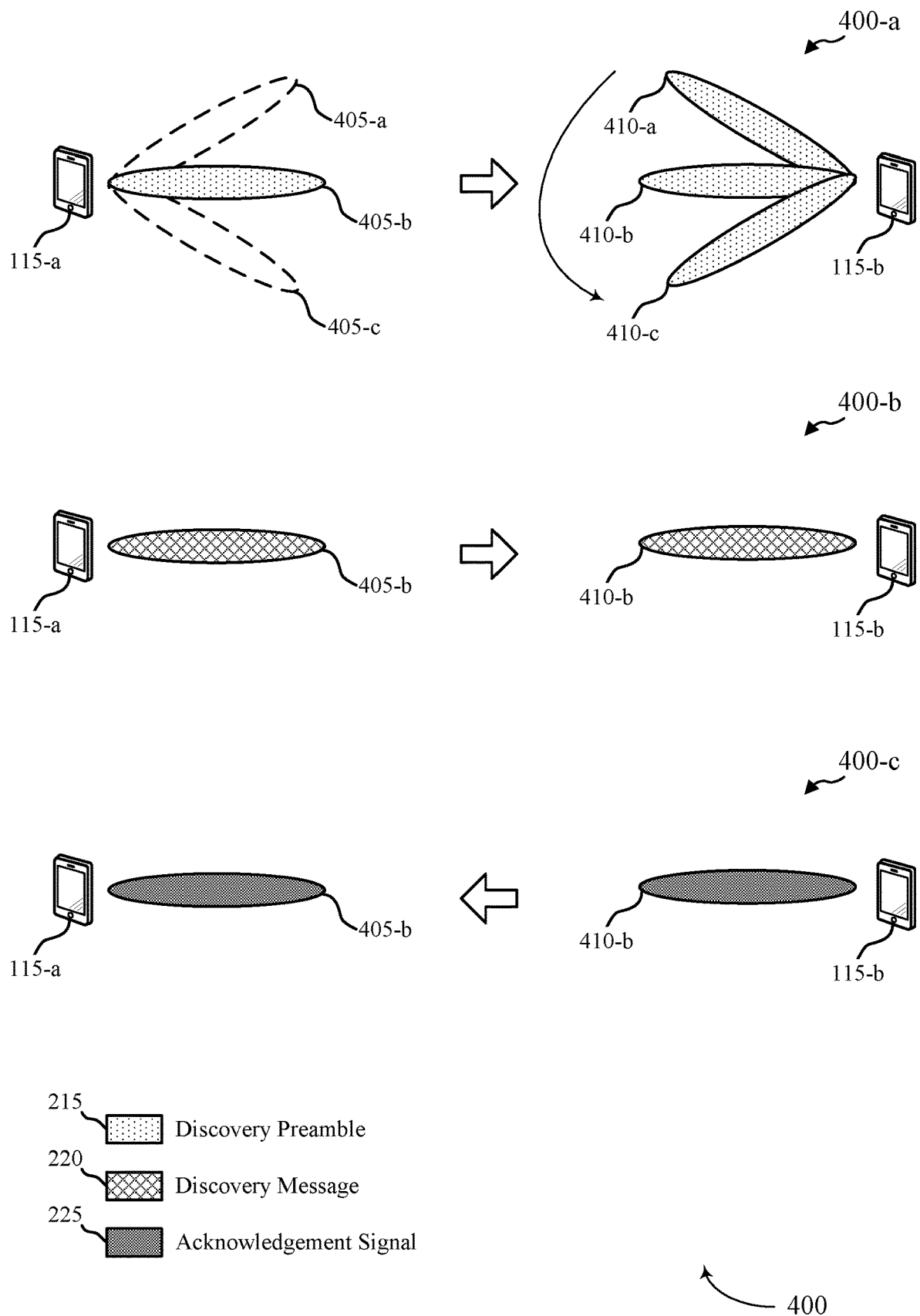
Figure 5:
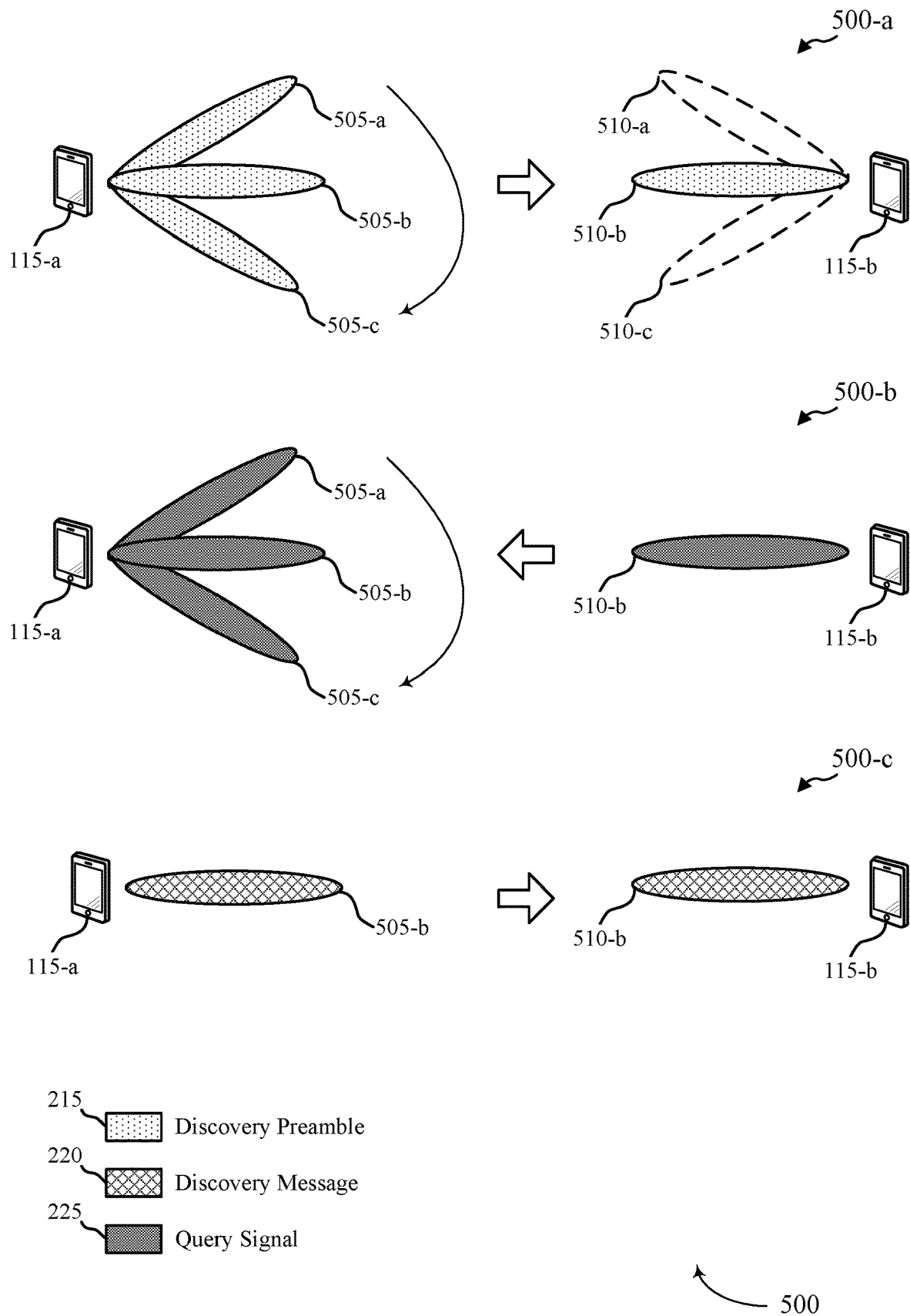

In some cases, after receiving the discovery message 220, the UE 115-*b* may transmit a response signal 225 (e.g., an acknowledgment signal) to the UE 115-*a* to acknowledge receipt of the discovery message 220. Thus, in the example of FIG. 2, the response signal 225 may be a query signal, an acknowledgment signal, or both. In such cases, after UE 115-*b* transmits the acknowledgment signal, UE 115-*b* may terminate or modify the configuration of a beam sweeping procedure used for monitoring for signals that include the discovery preamble from UE 115-*a*, and after UE 115-*a* receives the acknowledgment signal, UE 115-*a* may terminate or modify the configuration of a beam sweeping procedure used for transmitting signals that include the discovery preamble to UE 115-*b*. FIGS. 3-5 illustrate different examples of the beam sweeping procedures described above where UE 115-*a* may transmit multiple signals that include the discovery preamble using multiple transmit beams and UE 115-*b* may monitor for the signals that include the discovery preamble using multiple receive beams.

In the example of FIG. 3, UE 115-*a* may broadcast the discovery preamble 215 in a beam sweeping procedure to identify an appropriate beam for transmitting a discovery message 220 to UE 115-*b* and to allow UE 115-*b* to identify an appropriate beam for receiving the discovery message from UE 115-*a* (i.e., the discovery preamble may be used to identify a suitable beam pair link (BPL)). In this example, UE 115-*a* may generate discovery preamble 215 to transmit using each of its transmit beams, and UE 115-*b* may monitor for the discovery preamble 215 from UE 115-*a* using its receive beams. UE 115-*a* may broadcast multiple signals that include discovery preamble 215 in a transmission burst using a single transmit beam to allow one or more receiving devices to perform a receive beam sweep to identify a suitable beam for receiving the discovery message 220 from UE 115-*a*.

In a first transmission burst (as illustrated in 300-*a*), UE 115-*a* may broadcast M signals that include the discovery preamble 215 using a first transmit beam 305-*a*, where M corresponds to the number of receive beams available to receiving UEs (e.g., UE 115-*b*) in a wireless communications system. UE 115-*b* may monitor for the signals that include the discovery preamble 215 transmitted using the first transmit beam 305-*a*, and UE 115-*b* may attempt to receive each of the M signals that include the discovery preamble 215 using a different receive beam 310. In the example of FIG. 3, UE 115-*b* may fail to receive the signals that include the discovery preamble 215 using each of the receive beams 310 or UE 115-*b* may determine that the quality of each of the signals that include the discovery preamble 215 received in the first transmission burst is below a signal quality threshold, or may successfully receive a discovery preamble and determine, based at least on the information provided by the discovery preamble, that it does not pursue further communications with UE 115-*a*. Thus, UE 115-*b* may avoid transmitting a query signal to UE 115-*a* to request or trigger a transmission of the discovery message 220.

In a second transmission burst (as illustrated in 300-*a*), UE 115-*a* may broadcast the M signals that include the discovery preamble 215 using a second transmit beam 305-*b*. UE 115-*b* may monitor for the discovery preamble 215 transmitted using the second transmit beam 305-*b*, and UE 115-*b* may attempt to receive each of the M signals that include the discovery preamble 215 using a different receive beam 310. In this case, UE 115-*b* may successfully receive a signal that includes the discovery preamble 215 of the M signals that include the discovery preamble 215 using a second receive beam 310-*b*, and UE 115-*a* may determine that the quality of the received signal that includes the discovery preamble 215 is above a signal quality threshold. UE 115-*b* may additionally utilize the information provided by the discovery preamble to determine that it wants to pursue further communications with UE 115-*a*. Thus, UE 115-*b* may identify beam 310-*b* as a suitable beam for receiving the discovery message 220, and UE 115-*b* may terminate or modify the configuration of a beam sweeping procedure and avoid monitoring for additional signals that include the discovery preamble 215 from UE 115-*a*.

After identifying the beam 310-*b* as a suitable beam for communicating with UE 115-*a*, UE 115-*b* may transmit a query signal 225 to UE 115-*a* to request or trigger a transmission of the discovery message 220 (as illustrated in 300-*b*). UE 115-*b* may transmit the query signal 225 using the same beam (i.e., beam 310-*b*) used to successfully receive the discovery preamble 215. Further, since the query signal 225 may be received by UE 115-*a* after the second transmission burst, UE 115-*a* may receive the query signal 225 using the same beam used to transmit the discovery preamble 215 that was successfully received by UE 115-*b*. Thus, the beam used for the discovery preamble transmission (i.e., beam 305-*b* at UE 115-*a* and beam 310-*b* at UE 115-*b*) may be reciprocally spatially quasi-located with the beam used for the query signal transmission (i.e., beam 305-*b* at UE 115-*a* and beam 310-*b* at UE 115-*b*).

UE 115-*a* may then receive the query signal 225 from UE 115-*b*, and UE 115-*a* may terminate or modify the beam sweeping procedure and avoid broadcasting additional signals that include the discovery preamble 215. For instance, UE 115-*a* may avoid transmitting signals that include the discovery preamble 215 using transmit beam 305-*c* after identifying a suitable beam for transmitting the discovery message 220 to UE 115-*b*. UE 115-*b* may then broadcast the discovery message 220 using the identified beam (as illustrated in 300-*c*), and UE 115-*b* may receive the discovery message 220 using the identified beam. In this case, UE 115-*a* may transmit the discovery message 220 using the same transmit beam used to transmit the discovery preamble 215 that was successfully received by UE 115-*b*, and UE 115-*b* may receive the discovery message 220 using the same receive beam used to successfully receive the discovery preamble 215 from UE 115-*a*. Thus, the beam used for the discovery preamble transmission may be spatially quasi co-located with the beam used for the discovery message transmission.

In the example of FIG. 4, UE 115-*a* may broadcast the discovery preamble 215 in a beam sweeping procedure to identify an appropriate transmit beam for transmitting a discovery message 220 to UE 115-*b* and to allow UE 115-*b* to identify an appropriate receive beam for receiving the discovery message 220 from UE 115-*a* (i.e., the discovery preamble may be used to identify a suitable BPL). In this example, UE 115-*a* may generate multiple signals that include the discovery preamble 215 to transmit using each of its transmit beams, and UE 115-*b* may monitor for the signals that include the discovery preamble 215 from UE 115-*a* using its receive beams. UE 115-*a* may broadcast the discovery preamble 215 in a transmission burst using a single transmit beam to allow one or more receiving devices to perform a receive beam sweep to identify a suitable beam for receiving the discovery message 220 from UE 115-*a*.

In a first transmission burst (illustrated in 400-*a*), UE 115-*a* may broadcast M signals that include the discovery preamble 215 using a first transmit beam 405-*a*, where M corresponds to the number of receive beams available to receiving UEs (e.g., UE 115-*b*) in a wireless communications system. UE 115-*b* may monitor for the discovery preamble 215 transmitted using the first transmit beam 405-*a*, and UE 115-*b* may attempt to receive each of the M signals that include the discovery preamble 215 using a different receive beam 410. UE 115-*b* may then identify the receive beam of the receive beams 410 associated with the highest signal quality based on discovery preamble transmissions, UE 115-*b* may additionally use the information provided by the preamble and UE may determine to receive a subsequent discovery message 220 from UE 115-*a* using the identified receive beam.

After the first transmission burst in the beam sweeping procedure, UE 115-*a* may transmit a discovery message 220 using the first transmit beam 405-*a*, and UE 115-*b* may attempt to receive the discovery message using the identified receive beam. In the example of FIG. 4, UE 115-*b* may fail to receive the discovery message 220 transmitted using transmit beam 405-*a* or the quality of the discovery message 220 may be below a signal quality threshold, or may successfully receive the discovery message, but based on the information provided by the discovery message and/or preamble determine not to pursue further communications with UE 115-*a*. Accordingly, UE 115-*b* may avoid transmitting an acknowledgment signal to UE 115-*a* to acknowledge receipt of the discovery message 220. Thus, UE 115-*a* may determine to continue performing a beam sweeping procedure to identify a suitable beam for receiving a discovery message 220 from UE 115-*a* or another UE.

Accordingly, in a second transmission burst (illustrated in 400-*a*), UE 115-*a* may broadcast the M signals that include the discovery preamble 215 using a second transmit beam 405-*b*. UE 115-*b* may monitor for the discovery preamble 215 transmitted using the second transmit beam 405-*b*, and UE 115-*b* may attempt to receive each of the M signals that include the discovery preamble 215 using a different receive beam 410. UE 115-*b* may then identify the receive beam of the receive beams 410 associated with the highest signal quality based on the discovery preamble transmissions (e.g., receive beam 410-*b*), and UE 115-*b* may determine (e.g. based on the information provided by the preamble) to receive a subsequent discovery message 220 from UE 115-*a* using the identified receive beam.

After the second transmission burst in the beam sweeping procedure, UE 115-*a* may transmit a discovery message 220 using the second transmit beam 405-*b*, and UE 115-*b* may attempt to receive the discovery message 220 using the identified receive beam. In the example of FIG. 4 (as illustrated in 400-*b*), UE 115-*a* may determine that a signal quality of the discovery message 220 is above a signal quality threshold, and UE 115-*a* may determine that the discovery message 220 was successfully received, and determine to pursue further communications with UE 115-*a* based at least on the information provided by the discovery message and/or preamble. Accordingly (as illustrated in 400-*c*), UE 115-*b* may transmit an acknowledgement signal 225 to UE 115-*b* using the same beam used to receive the discovery message 220 from UE 115-*a* (i.e., beam 410-*b*) to acknowledge receipt of the discovery message 220. UE 115-*a* may then receive the acknowledgment signal using the same beam used to transmit the discovery message 220 to UE 115-*b* (i.e., beam 405-*b*).

In the example of FIG. 5, UE 115-*a* may broadcast the discovery preamble 215 in a beam sweeping procedure to identify an appropriate transmit beam for transmitting a discovery message 220 to UE 115-*b* and to allow UE 115-*b* to identify an appropriate receive beam for receiving the discovery message 220 from UE 115-*a* (i.e., the discovery preamble may be used to identify a suitable BPL). In this example, UE 115-*a* may generate a discovery preamble to transmit using each of its transmit beams, and UE 115-*b* may monitor for the discovery preamble from UE 115-*a* using its receive beams. UE 115-*a* may broadcast the discovery preamble in a transmission burst using multiple transmit beams in a transmit beam sweep to allow one or more receiving devices to identify a suitable receive beam for receiving the discovery message 220 from UE 115-*a*.

In a first transmission burst (as illustrated in 500-*a*), UE 115-*a* may broadcast N signals that include the discovery preamble 215 using N transmit beams, where N corresponds to the number of transmit beams available to UE 115-*a*. UE 115-*b* may monitor for the discovery preamble 215 transmitted using the N transmit beams using a first receive beam 510-*a*, and UE 115-*b* may attempt to receive each of the N signals that include the discovery preamble 215 using the first receive beam 510-*a*. In the example of FIG. 5, UE 115-*b* may fail to receive the discovery preamble 215 using the first receive beam 510-*a* or UE 115-*b* may determine that the quality of each of the signals that include the discovery preamble 215 received in the first transmission burst using receive beam 510-*a* is below a signal quality threshold or may successfully receive a preamble but determine, based on the information provided by the preamble, not to pursue further communications with UE 115-*a*. Thus, UE 115-*b* may avoid transmitting a query signal to UE 115-*a* to request or trigger a transmission of the discovery message.

In a second transmission burst (as illustrated in 500-*a*), UE 115-*a* may rebroadcast the N signals that include the discovery preamble 215 using the N transmit beams 505. UE 115-*b* may monitor for the discovery preamble 215 transmitted using the N transmit beams 505, and UE 115-*b* may attempt to receive each of the N signals that include the discovery preamble 215 using a second receive beam 510-*b*. In this case, UE 115-*b* may successfully receive a signal that includes the discovery preamble 215 of the N signals that include discovery preamble 215 using a second receive beam 510-*b*, and UE 115-*a* may determine that the quality of the received discovery preamble 215 is above a signal quality threshold, and determine, based on the information provided by the preamble, to pursue further communications with UE 115-*a*. Thus, UE 115-*b* may identify beam 510-*b* as a suitable beam for receiving the discovery message 220 from UE 115-*a*, and UE 115-*b* may terminate or modify the configuration of a beam sweeping procedure and avoid monitoring for additional signals that include the discovery preamble 215 from UE 115-*a*.

After identifying the beam 510-*b* as a suitable beam for communicating with UE 115-*a*, UE 115-*b* may transmit a query signal 225 to UE 115-*a* to request or trigger a transmission of the discovery message 220. However, since UE 115-*a* transmitted the discovery preamble 215 using multiple transmit beams, the query signal 225 may not be able to provide an indication of a suitable transmit beam for UE 115-*a* to use to transmit the discovery message 220. Thus (as illustrated in 500-*b*), UE 115-*b* may transmit the query signal N times using beam 510-*b* to allow UE 115-*a* to identify an appropriate beam for transmitting the discovery message 220 to UE 115-*b*. Alternatively, UE 115-*b* may transmit the query signal once and on a specific resource corresponding to the appropriate beam. Even in this case, UE 115-*a* may have to monitor for the query signal using multiple beams and on multiple resources to identify an appropriate beam for transmitting the discovery message 220 to UE 115-*b*. UE 115-*b* may transmit the query signal 225 using the same beam (i.e., beam 510-*b*) used to successfully receive the discovery preamble 215.

In the example of FIG. 5, UE 115-*a* may receive the query signals from UE 115-*b*, and UE 115-*a* may identify beam 505-*b* as the most suitable beam for transmitting the discovery message 220 (e.g., based on determining that the signal quality associated with the query signal received using beam 505-*b* is higher than the signal quality associated with the query signals received on other beams 505). UE 115-*a* may then terminate or modify the configuration of a beam sweeping procedure and avoid transmitting additional signals that include the discovery preamble 215 based on receiving the query signal 225, and UE 115-*a* may transmit the discovery message 220 using the identified beam (as illustrated in 500-*c*). UE 115-*a* may then receive the discovery message 220 from UE 115-*a* using the beam identified based on the discovery preamble 215 received from UE 115-*a* (i.e., beam 510-*b*).

Figure 6:
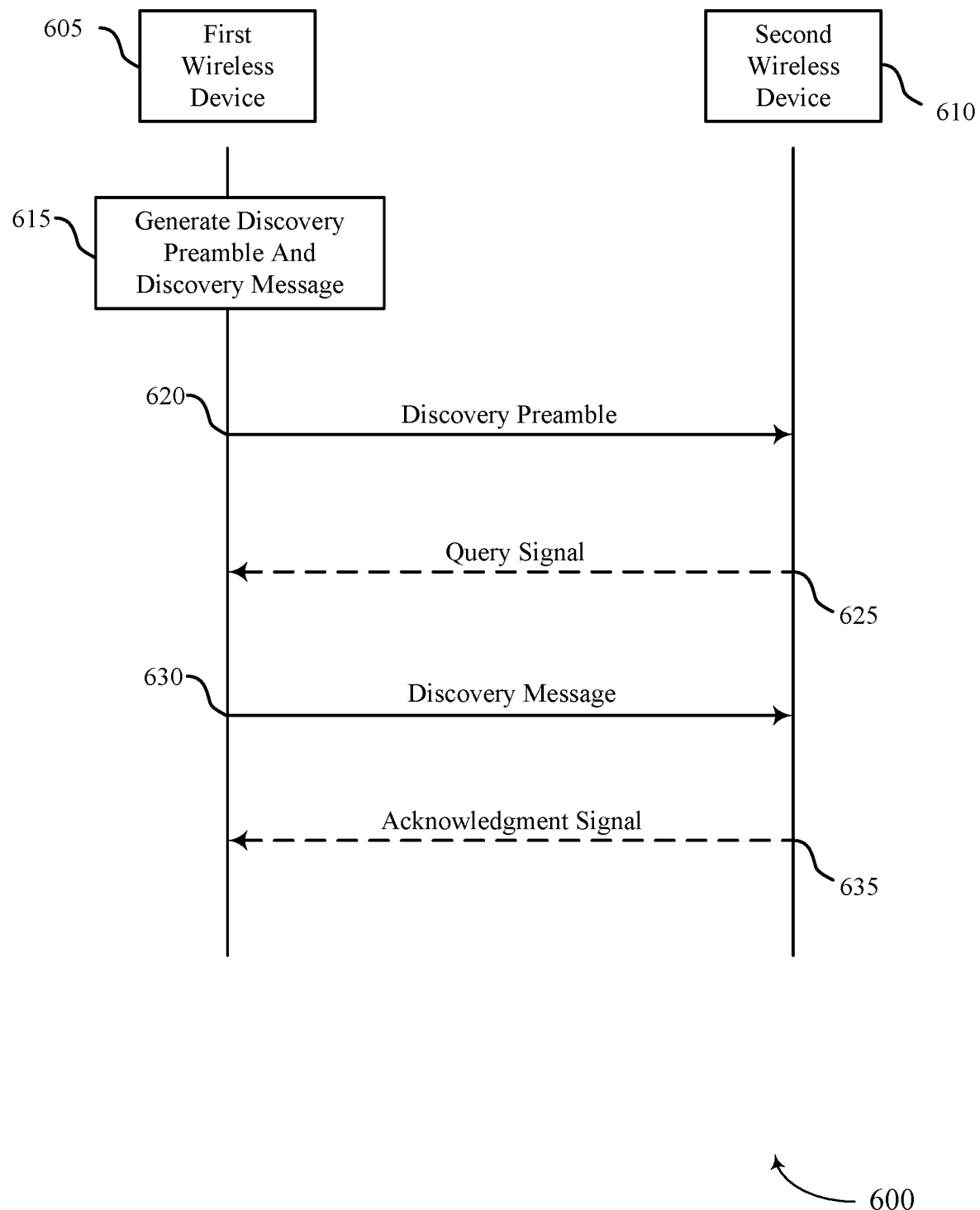
FIG. 6 illustrates an example of a process flow that supports content for a discovery preamble used during a device discovery procedure in accordance with aspects of the present disclosure.

FIG. 6 illustrates an example of a process flow 600 that supports content for a discovery preamble used during a device discovery procedure in accordance with various aspects of the present disclosure. Process flow 600 illustrates aspects of techniques performed by a first wireless device 605, which may be an example of a UE 115-*a* described with reference to FIGS. 2-5 or a base station 105 described with reference to FIG. 1. Process flow 600 also illustrates aspects of techniques performed by a second wireless device 610, which may be an example of a UE 115-*b* or a base station 105 described with reference to FIG. 1. The techniques described with respect to FIG. 6 may be used to improve the efficiency of broadcasting data using beamforming in a device discovery procedure for V2X communications (e.g., between two UEs 115) and for system information transmissions (e.g., in an initial access procedure between a base station 105 and a UE 115).

At 615, first wireless device 605 may generate a discovery preamble and a discovery message to broadcast in a device discovery procedure. The format of the discovery preamble and discovery message may be predefined or may be indicated by another device (e.g., a base station). The discovery preamble may indicate an upcoming transmission of the discovery message. In some cases, the discovery preamble may be transmitted N times for every transmission of a discovery message. N may be fixed, or alternatively, N may be configured dynamically (e.g., based on a number of beams available for a broadcast transmission).

In some cases, the device discovery procedure may be a device discovery procedure in V2X. In such cases, the discovery preamble may be a preamble of the discovery message that indicates an upcoming transmission of the discovery message, and the discovery message may include information for identifying a device in a V2X device discovery procedure, or information for the resources and configurations of the subsequent communications. Specifically, the discovery message may include information for discovering a device and establishing a connection with the device (e.g., information indicating whether first wireless device 605 has information to share with second wireless device 610 or information to receive from second wireless device 610, the type of information to share with or receive from second wireless device 610, etc.). In other cases, the device discovery procedure may be a part of an initial access procedure. In such cases, the discovery preamble may be a reference signal (e.g., a synchronization signal), and the discovery message may be system information (e.g., transmitted by a base station to a UE).

At 620, first wireless device 605 may transmit the discovery preamble to second wireless device 610 using a transmit beam as part of a beam sweeping procedure. Second wireless device 610 may receive the discovery preamble, and, in some cases, at 625, second wireless device 610 may transmit a query signal to first wireless device 605. The query signal may be in response to the discovery preamble, and may be used as a request or trigger for the discovery message. In some cases, the resources (e.g., time and frequency resources) and configurations (e.g., modulation and coding scheme (MCS) and numerology) used for the transmission of the query signal may be predefined or indicated by another device (e.g., a base station).

In other cases, the resources and configurations used for the transmission of the query signal may correspond to the resources and configurations used for the transmission of the discovery preamble. For example, second wireless device 610 may determine the time and frequency resources to use for the transmission of the query signal based on synchronization information (e.g., timing or frequency synchronization information) acquired from the discovery preamble. Additionally, second wireless device 610 may determine a transmit power for transmitting the query signal based on the receive power of the discovery preamble received at 620.

In some examples, the query signal may be a signal that carries no specific information (i.e., a static message) and may be common to devices in a wireless communications system (e.g., used for query signal transmissions by all devices in a wireless communications system). In other examples, the query signal may include some minimum information about second wireless device 610, such as information about the identity, scheduling, capabilities, states, or discovery modes of second wireless device 610. Further, the query signal may include a Zadoff-Chu (ZC) sequence, a pseudo-noise (PN) sequence, or a maximum length sequence (m-sequence).

Once the second wireless device 610 transmits the query signal, second wireless device 610 may terminate or modify the configuration of a beam sweeping procedure used for monitoring for signals that include a discovery preamble. And once the first wireless device 605 receives the query signal, first wireless device 605 may configure subsequent communications based on receiving the query signal. In one example, first wireless device 605 may terminate a beam sweeping procedure used for broadcasting signals that include the discovery preamble based on receiving the query signal. In another example, first wireless device 605 may reconfigure or adjust the beam sweeping procedure for subsequent communications based on receiving the query signal (e.g., using certain beams for discovery preamble transmissions more often than other beams in the beam sweeping procedure).

At 630, first wireless device 605 may then broadcast the discovery message to one or more UEs in a wireless communications system. In one example, first wireless device 605 may broadcast the discovery message when first wireless device 605 receives the query signal from second wireless device 610. In this example, first wireless device 605 may identify a suitable transmit beam for the transmission of the discovery message based on receiving the query signal. In another example, first wireless device 605 may transmit the discovery message to second wireless device 610 without receiving a query signal. In this example, the first wireless device 605 may transmit the discovery preamble using a particular transmit beam prior to the discovery message to allow a receiving device to identify a suitable receive beam for receiving the discovery message, and then first wireless device 605 may broadcast the discovery message using the transmit beam.

The resources and configurations used for the discovery message may depend on a variety of factors. In some cases, the resources and configurations used for the discovery message may be predefined or indicated by another device (e.g., a base station). In other cases, first wireless device 605 may determine the resources and configurations for the discovery message. For example first wireless device 605 may determine the resources and configurations used for the discovery message based on receiving the query signal (e.g., based on the resources and configurations used for the query signal or based on information about the schedule and capabilities of second wireless device 610 indicated in the query signal). Alternatively, first wireless device 605 may determine the resources and configurations used for the discovery message based on the resources and configurations used for the discovery preamble.

In some cases, first wireless device 605 may indicate the resources and configurations to be used for the discovery message transmission in the discovery preamble transmitted to second wireless device 610. In other cases, second wireless device 610 may determine the resources and configurations used for the discovery message based on the resources and configurations used for the discovery preamble or based on an indication from another device (e.g., a base station). In some aspects, the resources and configurations used for the discovery message may be one of K possible candidates (e.g., in a window of resources). In one example, second wireless device 610 may blindly check multiple hypotheses to receive the discovery message. In another example, the resources and configuration of the K possible candidates of the discovery message may be indicated in the discovery preamble. In yet another example, a subset of the multiple hypotheses may be indicated in the discovery preamble, and second wireless device 610 may blindly check the subset of the multiple hypothesis to receive the discovery message.

Second wireless device 610 may receive the discovery message, and, at 635, second wireless device 610 may transmit an acknowledgment signal in response to the discovery message to acknowledge receipt of the discovery message. In some examples, the acknowledgment signal may be a signal that carries no specific information (i.e., a static message) and may be common to devices in a wireless communications system (e.g., used for acknowledgment signal transmissions by all devices in a wireless communications system). In other examples, the acknowledgment signal may include some minimum information about second wireless device 610, such as information about the identity, scheduling, capabilities, states, or discovery modes of UE 115-b. Further, the acknowledgment signal may include a ZC sequence, a PN sequence, or an m-sequence.

In some cases, the resources (e.g., time and frequency resources) and configurations (e.g., MCS) used for the transmission of the acknowledgment signal may be predefined or indicated by another device (e.g., a base station). In other cases, the resources and configurations used for the transmission of the acknowledgment signal may correspond to the resources and configurations used for the transmission of the discovery preamble. For example, second wireless device 610 may determine the time and frequency resources to use for the transmission of the query signal based on synchronization information (e.g., timing or frequency synchronization information) acquired from the discovery preamble. Additionally, second wireless device 610 may determine a transmit power for transmitting the acknowledgment signal based on the receive power of the discovery preamble received at 620. In other cases, the resources and configurations used for the transmission of the acknowledgment signal may be indicated in the corresponding discovery message.

Once the second wireless device 610 transmits the acknowledgment signal, second wireless device 610 may terminate or modify the configuration of a beam sweeping procedure used for monitoring for signals that include the discovery preamble. And once the first wireless device 605 receives the acknowledgment signal, first wireless device 605 may configure subsequent communications based on receiving the acknowledgment signal. In one example, first wireless device 605 may terminate a beam sweeping procedure used for broadcasting signals that include the discovery preamble based on receiving the acknowledgment signal. In another example, first wireless device 605 may reconfigure or adjust the beam sweeping procedure for subsequent communications based on receiving the acknowledgement signal (e.g., using certain beams for discovery preamble transmissions more often than other beams in the beam sweeping procedure). In yet other examples, first wireless device 605 may initiate a link establishment procedure to establish a connection with second wireless device 610 based on receiving the acknowledgement signal. First wireless device 605 may also set or modify configurations for a random access procedure based on receiving the acknowledgement signal (e.g., allocating resources for signaling in the random access procedure).

Figure 7:
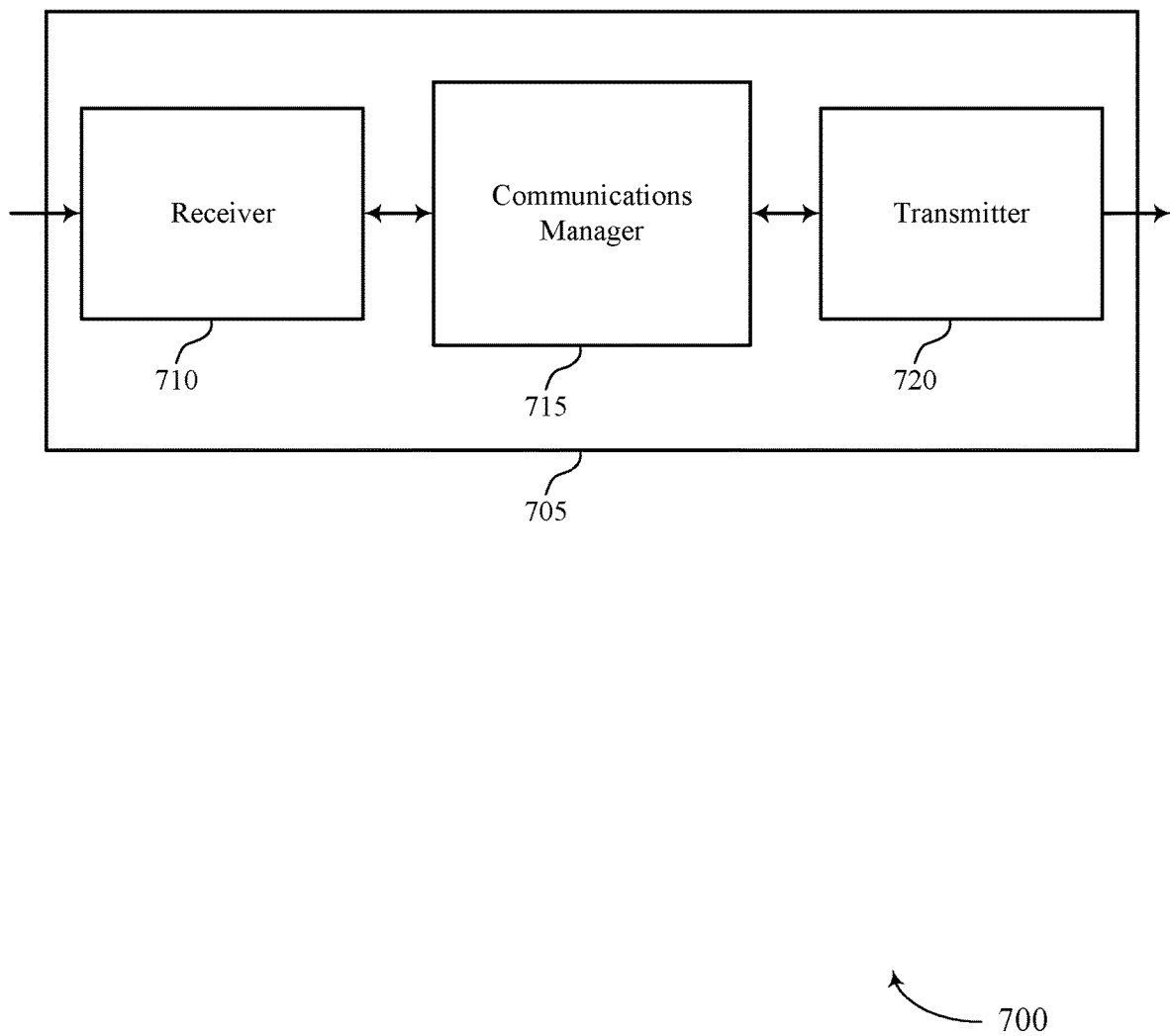
FIGS. 7-9 show block diagrams of a device that supports content for a discovery preamble used during a device discovery procedure in accordance with aspects of the present disclosure.

FIG. 7 shows a block diagram 700 of a wireless device 705 that supports content for a discovery preamble used during a device discovery procedure in accordance with aspects of the present disclosure. Wireless device 705 may be an example of aspects of a user equipment (UE) 115 or base station 105 as described herein. In some examples, the wireless device 705 may be an example of a transmitting device or a receiving device in a device discovery procedure. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to content for a discovery preamble used during a device discovery procedure, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may generate a discovery preamble and a discovery message in a device discovery procedure, where the discovery preamble includes information indicating that the discovery message will be transmitted, transmit the discovery preamble as part of a beam sweeping procedure performed during the device discovery procedure, and transmit the discovery message based on transmitting discovery preamble. The communications manager 715 may also receive a discovery preamble as part of a device discovery procedure, where the discovery preamble includes information indicating that the discovery message will be transmitted, determine whether to monitor for a discovery message of the device discovery procedure based on receiving the discovery preamble, and monitor for the discovery message based on the determination.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
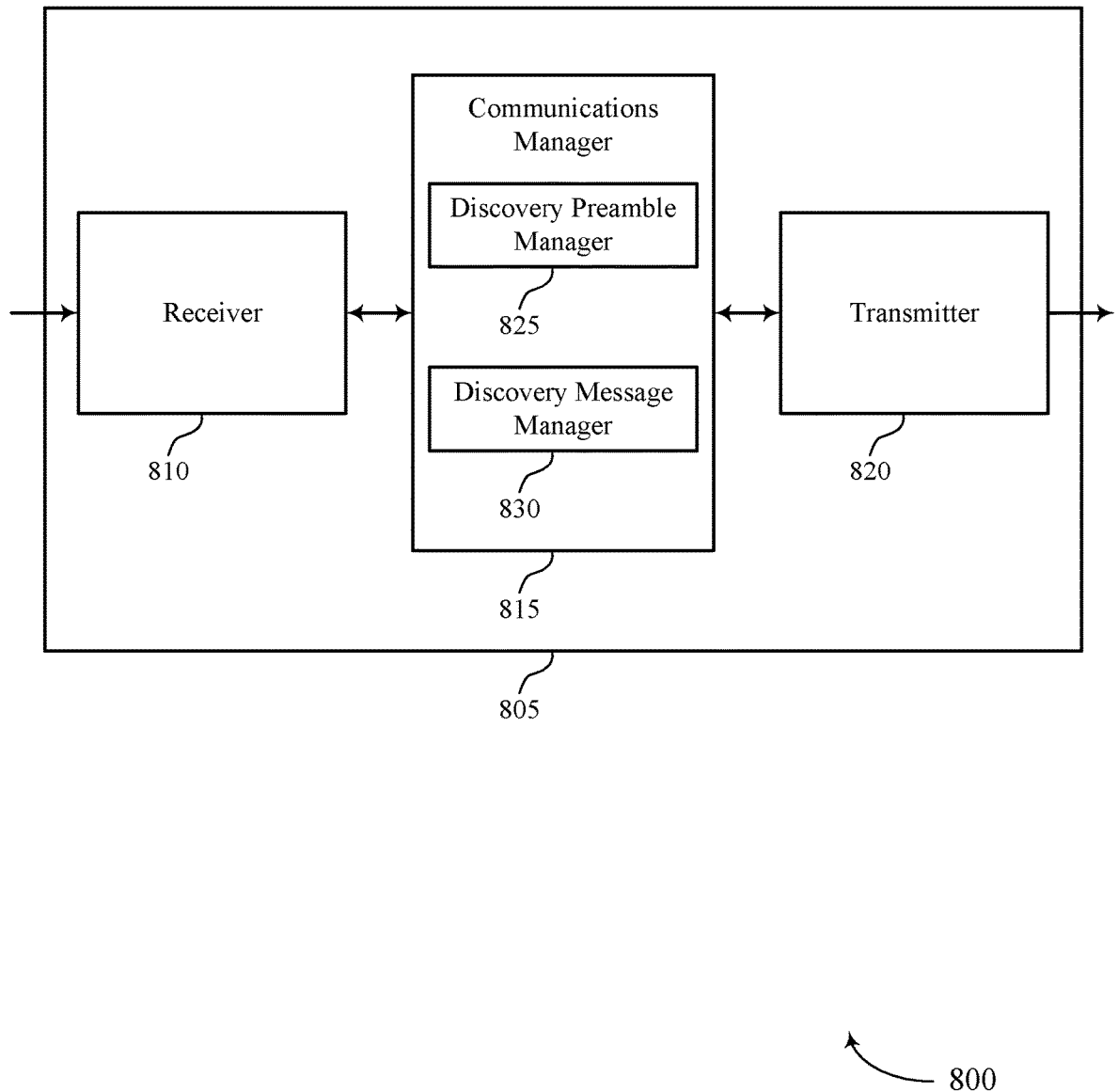

FIG. 8 shows a block diagram 800 of a wireless device 805 that supports content for a discovery preamble used during a device discovery procedure in accordance with aspects of the present disclosure. Wireless device 805 may be an example of aspects of a wireless device 705 or a UE 115 or base station 105 as described with reference to FIG. 7. In some examples, the wireless device 805 may be an example of a transmitting device or a receiving device in a device discovery procedure. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to content for a discovery preamble used during a device discovery procedure, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include discovery preamble manager 825 and discovery message manager 830.

Discovery preamble manager 825 may generate a discovery preamble and a discovery message in a device discovery procedure, where the discovery preamble includes information indicating that the discovery message will be transmitted, transmit the discovery preamble as part of a beam sweeping procedure performed during the device discovery procedure, and receive a discovery preamble as part of a device discovery procedure, where the discovery preamble includes information indicating that the discovery message will be transmitted. In some cases, the discovery preamble includes one or more of a preamble identifier, a discovery mode identifier, a beam configuration identifier, a communication resource identifier, a configuration identifier, or a beam sweep index identifier. In some cases, the discovery preamble includes one or more of a zadoff-chu sequence, a pseudo-noise sequence, or an m-sequence. In some cases, the discovery preamble includes a sequence generated using one or more of an amount of cyclic shift, a scrambling sequence, or communication resources used to transmit the discovery preamble. In some cases, the discovery preamble is a static message used by a set of transmitting devices. In some cases, the discovery preamble includes one or more of a preamble identifier, a discovery mode identifier, a beam configuration identifier, a communication resource identifier, a configuration identifier, or a beam sweep index identifier. In some cases, the discovery preamble is a static message used by a set of transmitting device.

Discovery message manager 830 may transmit the discovery message based on transmitting the discovery preamble, determine whether to monitor for a discovery message of the device discovery procedure based on receiving the discovery preamble, monitor for the discovery message based on the determination, and identify one or more characteristics of the discovery message based on receiving the discovery preamble, where determining to monitor for the discovery message is based on identifying the one or more characteristics of the discovery message. In some cases, the discovery message includes one or more of information related to a random access channel (RACH) procedure to establish a communication link between two devices, an identifier of a transmitting device, or sensor information. In some cases, the discovery message includes one or more of information related to a RACH procedure to establish a communication link between two devices, an identifier of a transmitting device, or sensor information.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
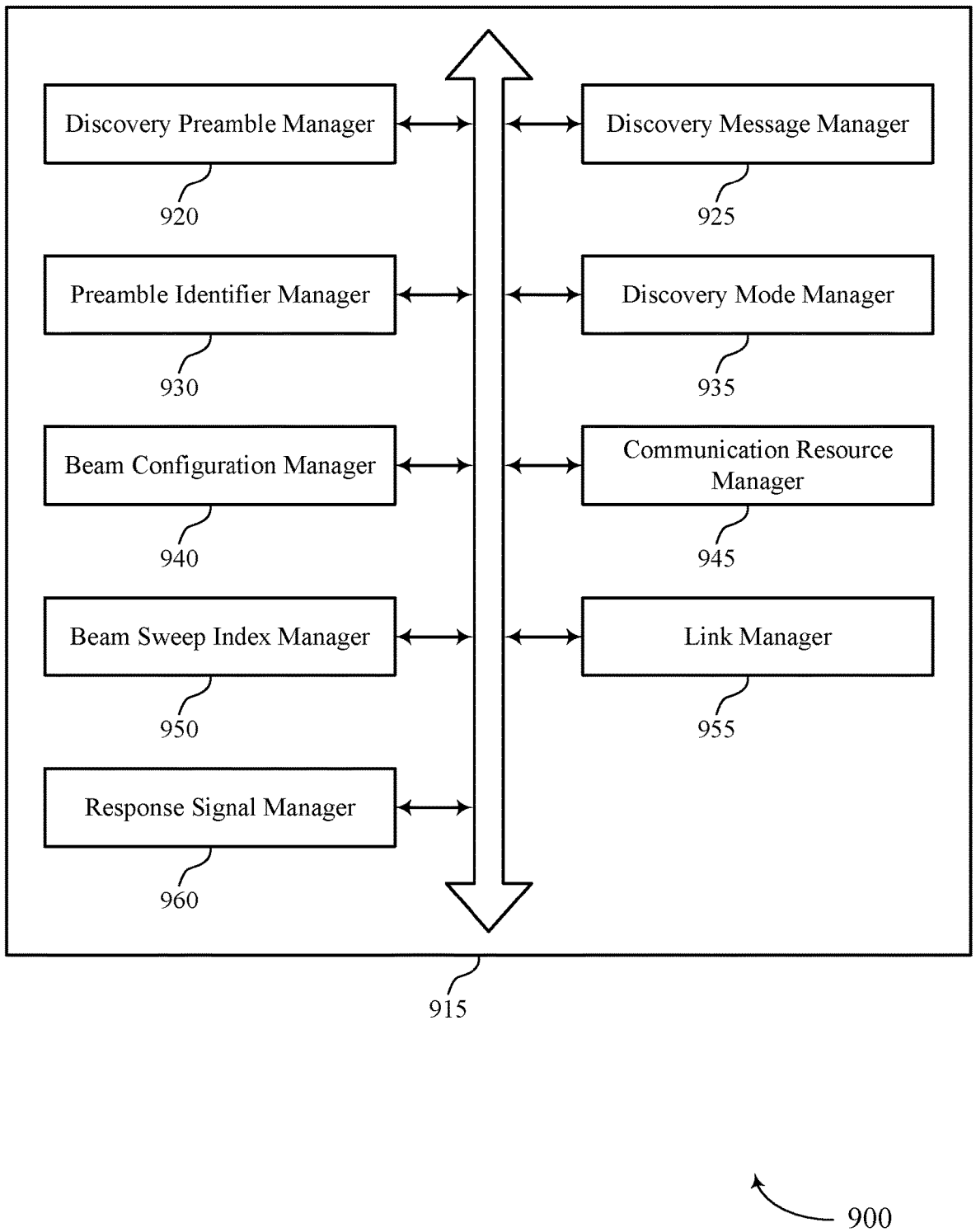

FIG. 9 shows a block diagram 900 of a communications manager 915 that supports content for a discovery preamble used during a device discovery procedure in accordance with aspects of the present disclosure. The communications manager 915 may be an example of aspects of a communications manager 715, a communications manager 815, or a communications manager 1015 described with reference to FIGS. 7, 8, and 10. The communications manager 915 may include discovery preamble manager 920, discovery message manager 925, preamble identifier manager 930, discovery mode manager 935, beam configuration manager 940, communication resource manager 945, beam sweep index manager 950, link manager 955, and response signal manager 960. Each of these modules may communicate, directly or indirectly, with one another (e.g., via one or more buses).

Discovery preamble manager 920 may generate a discovery preamble and a discovery message in a device discovery procedure, where the discovery preamble includes information indicating that the discovery message will be transmitted, transmit the discovery preamble as part of a beam sweeping procedure performed during the device discovery procedure, and receive a discovery preamble as part of a device discovery procedure, where the discovery preamble includes information indicating that the discovery message will be transmitted. In some cases, the discovery preamble includes one or more of a preamble identifier, a discovery mode identifier, a beam configuration identifier, a communication resource identifier, a configuration identifier, or a beam sweep index identifier. In some cases, the discovery preamble includes one or more of a zadoff-chu sequence, a pseudo-noise sequence, or an m-sequence. In some cases, the discovery preamble includes a sequence generated using one or more of an amount of cyclic shift, a scrambling sequence, or communication resources used to transmit the discovery preamble. In some cases, the discovery preamble is a static message used by a set of transmitting devices. In some cases, the discovery preamble includes one or more of a preamble identifier, a discovery mode identifier, a beam configuration identifier, a communication resource identifier, a configuration identifier, or a beam sweep index identifier. In some cases, the discovery preamble is a static message used by a set of transmitting device.

Discovery message manager 925 may transmit the discovery message based on transmitting the discovery preamble, determine to monitor for a discovery message of the device discovery procedure based on receiving the discovery preamble, monitor for the discovery message based on the determination, and identify one or more characteristics of the discovery message based on receiving the discovery preamble, where determining to monitor for the discovery message is based on identifying the one or more characteristics of the discovery message. In some cases, the discovery message includes one or more of information related to a RACH procedure to establish a communication link between two devices, an identifier of a transmitting device, or sensor information. In some cases, the discovery message includes one or more of information related to a RACH procedure to establish a communication link between two devices, an identifier of a transmitting device, or sensor information.

Preamble identifier manager 930 may generate a preamble identifier based on an identifier of a device that transmits the discovery message, where the discovery preamble includes the preamble identifier and identify a preamble identifier based on receiving the discovery preamble, where determining to monitor for the discovery message is based on identifying the preamble identifier.

Discovery mode manager 935 may identify a discovery mode of a transmitting device, generate a discovery mode identifier based on identifying the discovery mode, where the discovery preamble includes the discovery mode identifier, identify the discovery mode is based on one or more of whether the transmitting device is requesting information, the transmitting device is offering to share information, or a type of information requested or offered, and identify a discovery mode of a transmitting device based on receiving the discovery preamble, where determining to monitor for the discovery message is based on identifying the discovery mode. In some cases, the discovery mode is based on one or more of whether the transmitting device is requesting information, the transmitting device is offering to share information, or a type of information requested or offered.

Beam configuration manager 940 may identify a beam configuration for transmitting at least one of the discovery message or the discovery preamble, generate a beam configuration identifier based on identifying the beam configuration, where the discovery preamble includes the beam configuration identifier, and identify a beam configuration of the discovery message based on receiving the discovery preamble, where monitoring for the discovery message is based on identifying the beam configuration.

Communication resource manager 945 may identify a communication resource or a configuration for transmitting the discovery message, generate a communication resource identifier or a configuration identifier based on identifying the communication resource, where the discovery preamble includes the communication resource identifier or the configuration identifier, and identify a communication resource or a configuration for communicating the discovery message based on receiving the discovery preamble, where monitoring for the discovery message is based on identifying the communication resource or the configuration.

Beam sweep index manager 950 may identify a beam sweep index of a set of beams that carries the discovery preamble, generate a beam sweep index identifier based on identifying the beam sweep index, where the discovery preamble includes the beam sweep index, and identify a beam sweep index of a set of beams that carries the discovery preamble based on receiving the discovery preamble, where monitoring for the discovery message is based on identifying the beam sweep index of the discovery preamble. In some cases, the beam sweep index identifier includes one or more of a beam sweeping periodicity, a number of discovery signals transmitted within a period, a resource pattern within the period, a quasi-collocation assumption between different signals, or whether some signals are repeated. In some cases, the beam sweep index includes one or more of a beam sweeping periodicity, a number of discovery signals transmitted within a period, a resource pattern within the period, a quasi-collocation assumption between different signals, or whether some signals are repeated.

Link manager 955 may establish a device-to-device (D2D) communication link in a vehicle-to-everything (V2X) communication network based on transmitting the discovery message, receive the discovery message based on monitoring for the discovery message, and establish a device-to-device (D2D) communication link in a vehicle-to-everything (V2X) communication network based on receiving the discovery message.

Response signal manager 960 may receive a message in response to transmitting the discovery preamble, where transmitting the discovery message is based on receiving the message and transmit a message in response to receiving the discovery preamble, where the discovery message is received based on transmitting the message.

Figure 10:
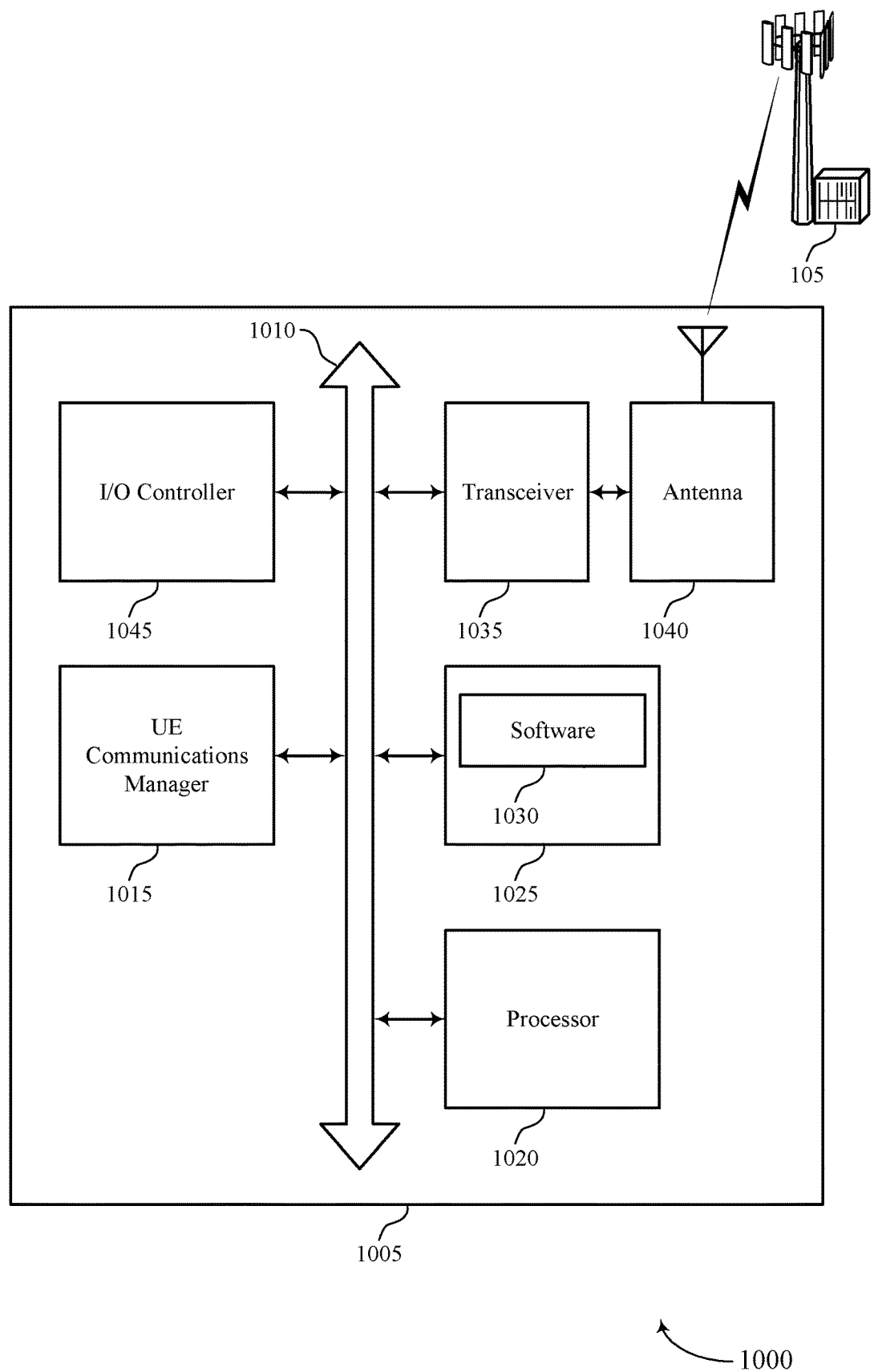
FIG. 10 illustrates a block diagram of a system including a UE that supports content for a discovery preamble used during a device discovery procedure in accordance with aspects of the present disclosure.

FIG. 10 shows a diagram of a system 1000 including a device 1005 that supports content for a discovery preamble used during a device discovery procedure in accordance with aspects of the present disclosure. Device 1005 may be an example of or include the components of wireless device 705, wireless device 805, or a UE 115 as described above, e.g., with reference to FIGS. 7 and 8. In some examples, the wireless device 1005 may be an example of a transmitting UE 115-*a* or a receiving UE 115-*b* in a device discovery procedure. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting content for a discovery preamble used during a device discovery procedure).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support content for a discovery preamble used during a device discovery procedure. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
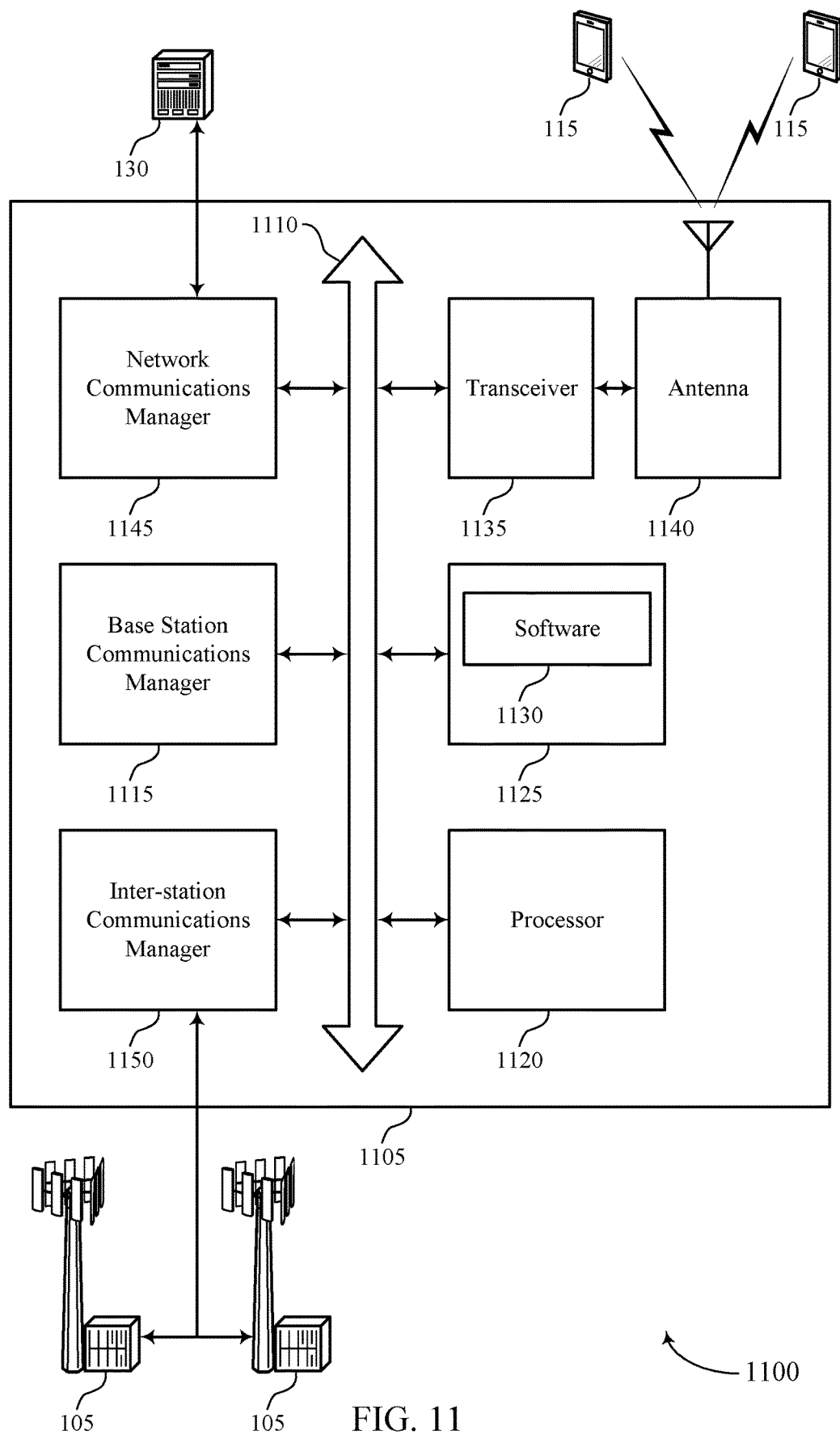
FIG. 11 illustrates a block diagram of a system including a base station that supports content for a discovery preamble used during a device discovery procedure in accordance with aspects of the present disclosure.

FIG. 11 shows a diagram of a system 1100 including a device 1105 that supports content for a discovery preamble used during a device discovery procedure in accordance with aspects of the present disclosure. Device 1105 may be an example of or include the components of wireless device 805, wireless device 905, or a base station 105 as described above, e.g., with reference to FIGS. 8 and 9. In some examples, the wireless device 1105 may be an example of a transmitting base station or a receiving base station in a device discovery procedure. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting content for a discovery preamble used during a device discovery procedure).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support content for a discovery preamble used during a device discovery procedure. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a Long Term Evolution (LTE)/LTE-A wireless communication network technology to provide communication between base stations 105.

Figure 12:
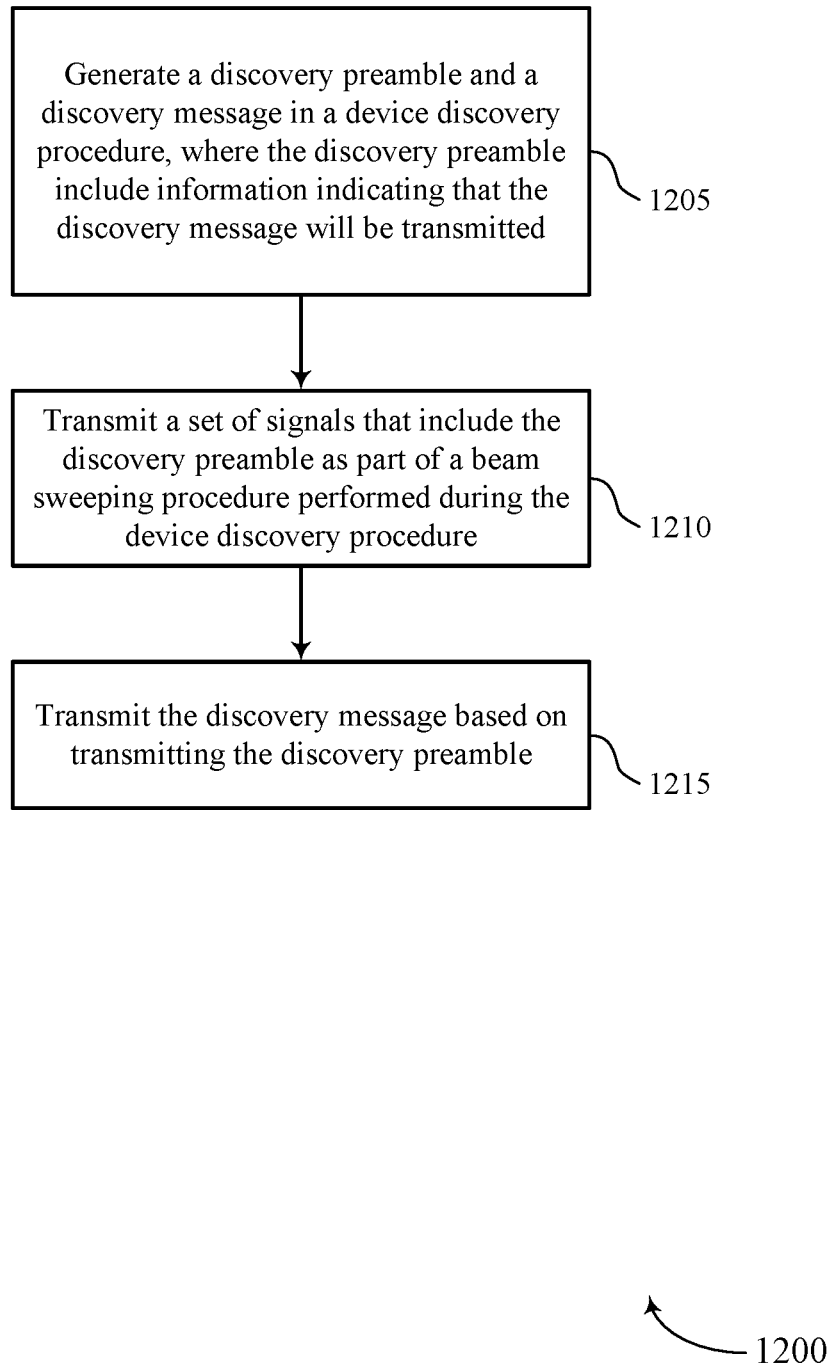
FIGS. 12-13 illustrate methods for content for a discovery preamble used during a device discovery procedure in accordance with aspects of the present disclosure.

FIG. 12 shows a flowchart illustrating a method 1200 for content for a discovery preamble used during a device discovery procedure in accordance with aspects of the present disclosure. The operations of method 1200 may be implemented by a transmitting device in a device discovery procedure such as a UE 115 or base station 105 or its components as described herein. For example, the operations of method 1200 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the transmitting UE 115 or transmitting base station 105 may generate a discovery preamble and a discovery message in a device discovery procedure, where the discovery preamble includes information indicating that the discovery message will be transmitted. The operations of 1205 may be performed according to the methods described herein. In certain examples, aspects of the operations of 1205 may be performed by a discovery preamble manager as described with reference to FIGS. 7 through 9.

At 1210 the transmitting UE 115 or transmitting base station 105 may transmit a set of signals that include the discovery preamble as part of a beam sweeping procedure performed during the device discovery procedure. The operations of 1210 may be performed according to the methods described herein. In certain examples, aspects of the operations of 1210 may be performed by a discovery preamble manager as described with reference to FIGS. 7 through 9.

At 1215 the transmitting UE 115 or transmitting base station 105 may transmit the discovery message based at least in part on transmitting the discovery preamble. The operations of 1215 may be performed according to the methods described herein. In certain examples, aspects of the operations of 1215 may be performed by a discovery message manager as described with reference to FIGS. 7 through 9.

Figure 13:
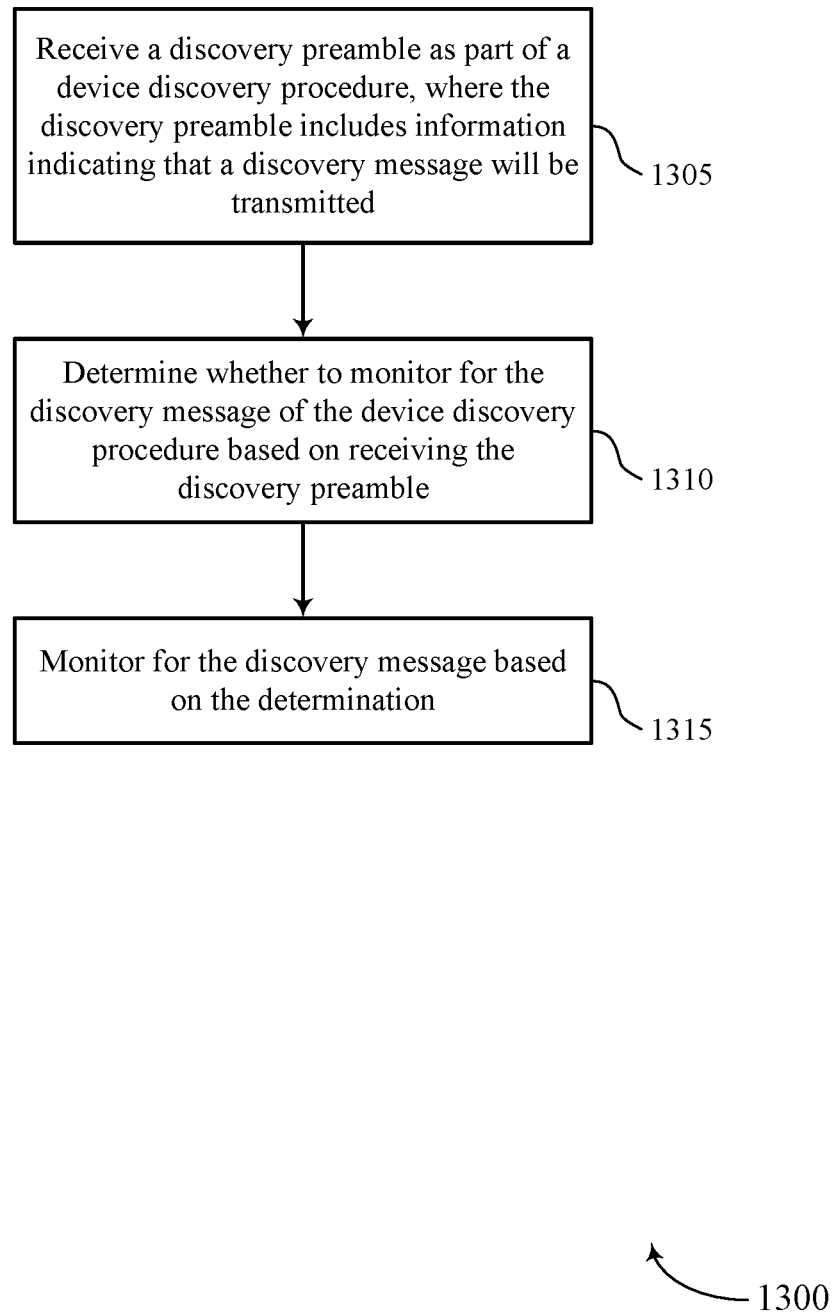

FIG. 13 shows a flowchart illustrating a method 1300 for content for a discovery preamble used during a device discovery procedure in accordance with aspects of the present disclosure. The operations of method 1300 may be implemented by a receiving device in a device discovery procedure such as a UE 115 or base station 105 or its components as described herein. For example, the operations of method 1300 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305 the receiving UE 115 or receiving base station 105 may receive a discovery preamble as part of a device discovery procedure, where the discovery preamble includes information indicating that a discovery message will be transmitted. The operations of 1305 may be performed according to the methods described herein. In certain examples, aspects of the operations of 1305 may be performed by a discovery preamble manager as described with reference to FIGS. 7 through 9.

At 1310 the receiving UE 115 or receiving base station 105 may determine whether to monitor for the discovery message of the device discovery procedure based at least in part on receiving the discovery preamble. The operations of 1310 may be performed according to the methods described herein. In certain examples, aspects of the operations of 1310 may be performed by a discovery message manager as described with reference to FIGS. 7 through 9.

At 1315 the receiving UE 115 or receiving base station 105 may monitor for the discovery message based at least in part on the determination. The operations of 1315 may be performed according to the methods described herein. In certain examples, aspects of the operations of 1315 may be performed by a discovery message manager as described with reference to FIGS. 7 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
generating a discovery preamble and a discovery message in a device discovery procedure, wherein the discovery preamble includes information indicating that the discovery message will be transmitted;
transmitting a plurality of directional beams that each convey the discovery preamble as part of a beam sweeping procedure performed during the device discovery procedure; and
transmitting the discovery message using a first directional beam of the plurality of directional beams based at least in part on transmitting the discovery preamble.

2. The method of claim 1, further comprising:
generating a preamble identifier based at least in part on an identifier of a device that transmits the discovery message, wherein the discovery preamble includes the preamble identifier.

3. The method of claim 1, further comprising:
identifying a discovery mode of a transmitting device; and
generating a discovery mode identifier based at least in part on identifying the discovery mode, wherein the discovery preamble includes the discovery mode identifier.

4. The method of claim 3, wherein identifying the discovery mode is based at least in part on one or more of whether the transmitting device is requesting information, the transmitting device is offering to share information, or a type of information requested or offered.

5. The method of claim 1, further comprising:
identifying a beam configuration for transmitting at least one of the discovery message or the discovery preamble; and
generating a beam configuration identifier based at least in part on identifying the beam configuration, wherein the discovery preamble includes the beam configuration identifier.

6. The method of claim 1, further comprising:
identifying a communication resource or a configuration for transmitting the discovery message; and
generating a communication resource identifier or a configuration identifier based at least in part on identifying the communication resource, wherein the discovery preamble includes the communication resource identifier or the configuration identifier.

7. The method of claim 1, further comprising:
identifying a beam sweep index of a plurality of beams that carry the discovery preamble; and
generating a beam sweep index identifier based at least in part on identifying the beam sweep index, wherein the discovery preamble includes the beam sweep index.

8. The method of claim 7, wherein the beam sweep index identifier includes one or more of a beam sweeping periodicity, a number of discovery signals transmitted within a period, a resource pattern within the period, a quasi-collocation assumption between different signals, or whether some signals are repeated.

9. The method of claim 1, wherein the discovery preamble includes one or more of a preamble identifier, a discovery mode identifier, a beam configuration identifier, a communication resource identifier, a configuration identifier, or a beam sweep index identifier.

10. The method of claim 1, wherein the discovery preamble includes one or more of a zadoff-chu sequence, a pseudo-noise sequence, or an m-sequence.

11. The method of claim 1, wherein the discovery preamble includes a sequence generated using one or more of an amount of cyclic shift, a scrambling sequence, or communication resources used to transmit the discovery preamble.

12. The method of claim 1, wherein the discovery preamble is a static message used by a plurality of transmitting devices.

13. The method of claim 1, further comprising:
establishing a device-to-device (D2D) communication link in a vehicle-to-everything (V2X) communication network based at least in part on transmitting the discovery message.

14. The method of claim 1, further comprising:
receiving a message in response to transmitting the discovery preamble, wherein transmitting the discovery message is based at least in part on receiving the message.

15. The method of claim 1, wherein the discovery message includes one or more of information related to a random access channel (RACH) procedure to establish a communication link between two devices, an identifier of a transmitting device, or sensor information.

16. An apparatus for wireless communication, comprising:
a processor;
memory in electronic communication with the processor; and
instructions stored in the memory and executable by the processor to cause the apparatus to:
generate a discovery preamble and a discovery message in a device discovery procedure, wherein the discovery preamble includes information indicating that the discovery message will be transmitted;
transmit a plurality of directional beams that each convey the discovery preamble as part of a beam sweeping procedure performed during the device discovery procedure; and
transmit the discovery message using a first directional beam of the plurality of directional beams based at least in part on transmitting the discovery preamble.

17. The apparatus of claim 16, wherein the instructions are further executable by the processor to cause the apparatus to:
generate a preamble identifier based at least in part on an identifier of a device that transmits the discovery message, wherein the discovery preamble includes the preamble identifier.

18. The apparatus of claim 16, wherein the instructions are further executable by the processor to cause the apparatus to:
identify a discovery mode of a transmitting device; and
generate a discovery mode identifier based at least in part on identifying the discovery mode, wherein the discovery preamble includes the discovery mode identifier.

19. The apparatus of claim 18, wherein identifying the discovery mode is based at least in part on one or more of whether the transmitting device is requesting information, the transmitting device is offering to share information, or a type of information requested or offered.

20. The apparatus of claim 16, wherein the instructions are further executable by the processor to cause the apparatus to:
identify a beam configuration for transmitting at least one of the discovery message or the discovery preamble; and
generate a beam configuration identifier based at least in part on identifying the beam configuration, wherein the discovery preamble includes the beam configuration identifier.

21. The apparatus of claim 16, wherein the instructions are further executable by the processor to cause the apparatus to:
identify a communication resource or a configuration for transmitting the discovery message; and
generate a communication resource identifier or a configuration identifier based at least in part on identifying the communication resource, wherein the discovery preamble includes the communication resource identifier or the configuration identifier.

22. The apparatus of claim 16, wherein the instructions are further executable by the processor to cause the apparatus to:
identify a beam sweep index of a plurality of beams that carry the discovery preamble; and
generate a beam sweep index identifier based at least in part on identifying the beam sweep index, wherein the discovery preamble includes the beam sweep index.

23. The apparatus of claim 22, wherein the beam sweep index identifier includes one or more of a beam sweeping periodicity, a number of discovery signals transmitted within a period, a resource pattern within the period, a quasi-collocation assumption between different signals, or whether some signals are repeated.

24. The apparatus of claim 16, wherein the discovery preamble includes one or more of a preamble identifier, a discovery mode identifier, a beam configuration identifier, a communication resource identifier, a configuration identifier, or a beam sweep index identifier.

25. The apparatus of claim 16, wherein the discovery preamble includes one or more of a zadoff-chu sequence, a pseudo-noise sequence, or an m-sequence.

26. The apparatus of claim 16, wherein the discovery preamble includes a sequence generated using one or more of an amount of cyclic shift, a scrambling sequence, or communication resources used to transmit the discovery preamble.

27. The apparatus of claim 16, wherein the discovery preamble is a static message used by a plurality of transmitting devices.

28. The apparatus of claim 16, wherein the instructions are further executable by the processor to cause the apparatus to:
establish a device-to-device (D2D) communication link in a vehicle-to-everything (V2X) communication network based at least in part on transmitting the discovery message.

29. An apparatus for wireless communication, comprising:
means for generating a discovery preamble and a discovery message in a device discovery procedure, wherein the discovery preamble includes information indicating that the discovery message will be transmitted;

means for transmitting a plurality of directional beams that each convey the discovery preamble as part of a beam sweeping procedure performed during the device discovery procedure; and means for transmitting the discovery message using a first directional beam of the plurality of directional beams based at least in part on transmitting the discovery preamble.

30. A non-transitory computer-readable medium storing code for wireless communication, the code comprising instructions executable by a processor to:

generate a discovery preamble and a discovery message in a device discovery procedure, wherein the discovery preamble includes information indicating that the discovery message will be transmitted;

transmit a plurality of directional beams that each convey the discovery preamble as part of a beam sweeping procedure performed during the device discovery procedure; and transmit the discovery message using a first directional beam of the plurality of directional beams based at least in part on transmitting the discovery preamble.

* * * * *